US012188442B2

(12) United States Patent
Madison et al.

(10) Patent No.: US 12,188,442 B2
(45) Date of Patent: Jan. 7, 2025

(54) SYSTEMS AND METHODS OF POWER GENERATION WITH AQUIFER STORAGE AND RECOVERY SYSTEM

(71) Applicant: 3R Valve, LLC, Echo, OR (US)

(72) Inventors: Kent R. Madison, Echo, OR (US); Matthew F. Johnson, Hayden, ID (US)

(73) Assignee: 3R Valve, LLC, Echo, OR (US)

( * ) Notice: Subject to any disclaimer, the term of this patent is extended or adjusted under 35 U.S.C. 154(b) by 38 days.

(21) Appl. No.: 18/061,658

(22) Filed: Dec. 5, 2022

(65) Prior Publication Data

US 2023/0101657 A1 Mar. 30, 2023

Related U.S. Application Data

(63) Continuation of application No. 17/124,243, filed on Dec. 16, 2020, now Pat. No. 11,536,240.

(60) Provisional application No. 62/971,874, filed on Feb. 7, 2020.

(51) Int. Cl.
*F03B 13/06* (2006.01)

(52) U.S. Cl.
CPC .................................... *F03B 13/06* (2013.01)

(58) Field of Classification Search
CPC ........ E21B 34/102; E21B 34/10; E21B 34/16; E21B 34/06; F03B 13/06
See application file for complete search history.

(56) References Cited

U.S. PATENT DOCUMENTS 1,481,797 A 1/1924 Hadden
1,887,746 A * 11/1932 Zublin .................. E21B 43/122 417/54
3,378,068 A * 4/1968 Page, Jr. ................. E21B 34/10 166/373
3,802,802 A * 4/1974 Greer ...................... F04B 47/02 417/313
4,026,661 A * 5/1977 Roeder ................... F04B 47/08 60/560
4,118,154 A * 10/1978 Roeder ................. F04B 9/1053 417/403
4,173,451 A * 11/1979 Moore, Jr. ............ F04B 19/022 417/457
4,214,628 A 7/1980 Botts
4,214,854 A * 7/1980 Roeder ................... F04B 47/08 417/403

(Continued)

FOREIGN PATENT DOCUMENTS

WO 2012054512 4/2012
WO 2017141027 8/2017

*Primary Examiner* — Aaron L Lembo

(74) *Attorney, Agent, or Firm* — Klarquist Sparkman, LLP

(57) ABSTRACT

An aquifer storage and recovery system can include a pump, an electric motor coupled to the pump, a drive unit configured to control operation of the electric motor, and a controller. The controller can be configured to flow water into a well bore from a source reservoir through the pump such that the pump rotates in a reverse direction and drives the electric motor coupled to the pump in the reverse direction to operate as a generator, determine a power output of the electric motor, determine a difference between the power output of the electric motor and a power output set point, and operate the drive unit to control a rotational speed of the electric motor based at least in part on the difference between the power output of the electric motor and the power output set point.

20 Claims, 16 Drawing Sheets

(56) References Cited

U.S. PATENT DOCUMENTS 4,248,305 A * 2/1981 Scarbrough ............. E21B 43/30 166/305.1
4,284,900 A * 8/1981 Botts ....................... F03B 13/06 290/43
4,421,463 A * 12/1983 Lee ....................... F04B 9/1073 417/383
4,481,455 A 11/1984 Sugimoto et al.
4,519,457 A * 5/1985 Holland .................. E21B 34/14 166/325
4,534,715 A * 8/1985 Jones ...................... E21B 34/06 417/511
4,606,408 A * 8/1986 Zunkel .................... E21B 43/10 166/146
4,625,125 A 11/1986 Kuwabara
4,816,696 A 3/1989 Sakayori et al.
5,365,424 A 11/1994 Deam et al.
5,369,353 A 11/1994 Erdman
5,505,258 A * 4/1996 Muth .................... E21B 33/122 166/313
5,526,252 A 6/1996 Erdman
5,579,217 A 11/1996 Deam et al.
5,585,708 A 12/1996 Richardson et al.
5,871,200 A 2/1999 Wallace et al.
6,000,880 A 12/1999 Halus
6,073,906 A * 6/2000 Wallace ................ F16K 31/122 92/111
6,082,452 A * 7/2000 Shaw ...................... E21B 34/06 166/313
6,089,322 A * 7/2000 Kelley .................... E21B 43/38 166/372
6,279,651 B1 8/2001 Schwendemann et al.
6,338,466 B1 1/2002 Wallace et al.
6,420,794 B1 7/2002 Cao
6,497,281 B2 * 12/2002 Vann ..................... E21B 47/008 166/250.15
6,811,353 B2 11/2004 Madison
6,926,504 B2 * 8/2005 Howard .................. E21B 27/02 166/66.4
6,998,724 B2 2/2006 Johansen et al.
7,051,813 B2 * 5/2006 Hayes ................... F04B 53/126 166/332.4
7,153,060 B1 12/2006 Bennion
7,156,578 B2 1/2007 Madison
7,314,081 B2 * 1/2008 Tokarek ................ E21B 43/126 417/418
7,795,748 B2 9/2010 DeAngeles
7,843,076 B2 11/2010 Gogoana et al.
8,033,328 B2 10/2011 Hall et al.
8,303,272 B2 * 11/2012 Pugh ....................... F04B 47/08 417/401
8,387,705 B2 * 3/2013 Heironimus ............ E21B 21/08 166/359
8,522,882 B2 * 9/2013 Rich ....................... F04B 19/04 166/105.2
8,522,887 B1 9/2013 Madison
8,638,004 B2 * 1/2014 Badger ................... F03B 13/02 290/43
8,737,558 B2 5/2014 Fiske
9,441,435 B2 * 9/2016 Leitch ................... E21B 43/128
9,488,160 B2 11/2016 Fisher et al.
9,726,150 B2 8/2017 Littmann et al.
10,053,954 B2 * 8/2018 Stautzenberger ....... E21B 33/14
10,167,700 B2 * 1/2019 Brasseaux ............... E21B 33/12
10,180,051 B2 * 1/2019 Vasques ................ E21B 33/126
10,184,317 B2 * 1/2019 Silva ..................... F16K 15/145
10,465,651 B2 11/2019 Herl
10,883,349 B2 * 1/2021 Campbell ............. E21B 43/129
10,982,507 B2 * 4/2021 Sladic ................... E21B 33/126
11,261,701 B2 * 3/2022 Kshyk ..................... E21B 34/14
11,300,121 B2 * 4/2022 Correa .................. E21B 43/126
2002/0180215 A1 12/2002 Mitchell
2006/0127184 A1 6/2006 Madison
2009/0085353 A1 4/2009 Riley
2009/0121481 A1 * 5/2009 Riley ...................... F03B 13/06 290/43
2009/0212573 A1 8/2009 Riley
2012/0119510 A1 5/2012 Herzen et al.
2012/0285539 A1 11/2012 Riley
2013/0327547 A1 12/2013 Madison
2014/0246860 A1 9/2014 Payre et al.
2016/0061003 A1 3/2016 Gottumukkala et al.
2019/0186458 A1 6/2019 Obermeyer et al.
2021/0140273 A1 * 5/2021 Saponja ................ E21B 34/142

* cited by examiner

SYSTEMS AND METHODS OF POWER GENERATION WITH AQUIFER STORAGE AND RECOVERY SYSTEM

CROSS REFERENCE TO RELATED APPLICATION

This application is a continuation of U.S. patent application Ser. No. 17/124,243, filed Dec. 16, 2020, which claims the benefit of U.S. Provisional Application No. 62/971,874, filed Feb. 7, 2020, each of which is incorporated herein by reference in its entirety.

FIELD

The present disclosure pertains to systems and methods of generating electricity when water is supplied from a source reservoir to an aquifer through a well.

BACKGROUND

In many geographic areas, aquifers are a primary source of water for use in agriculture and for other purposes. Water can be withdrawn from the aquifer through a well bore using a pump system typically including a pump, a motor, valves, and a control system. Water can be returned to the aquifer through the well bore to charge or replenish the aquifer during, for example, periods of excess rainfall, so that the water stored in the aquifer is then available during dry times of year. When water is returned to the aquifer through the well bore, the pressure head developed in the well bore column can be significant, depending on the depth of the well bore. However, existing pump systems are not configured to efficiently generate electricity during the aquifer recharge process, if at all. Accordingly, there exists a need for improved aquifer storage and recovery systems and associated methods.

SUMMARY

Certain embodiments of the disclosure pertain to systems and control methodologies for generating power when injecting water into an underground formation such as an aquifer, using equipment also configured to withdraw water out of the underground formation. The disclosed systems can be configured to adjust various operating parameters of any of various system components, such as the frequency of the drive signal provided to the electric motor, the flow rate through the well bore, the pressure in the well bore, the rotational speed of the motor, the drive signal voltage, the excitation voltage, etc., to maximize power generation under the prevailing flow conditions. In a representative embodiment, an aquifer storage and recovery system comprises a pump, an electric motor coupled to the pump, a drive unit configured to control operation of the electric motor, and a controller configured to flow water into a well bore from a source reservoir through the pump such that the pump rotates in a reverse direction and drives the electric motor coupled to the pump in the reverse direction to operate as a generator. The controller can be further configured to determine a power output of the electric motor, determine a difference between the power output of the electric motor and a power output set point, and operate the drive unit to control a rotational speed of the electric motor based at least in part on the difference between the power output of the electric motor and the power output set point.

In any or all of the disclosed embodiments, operating the drive unit to control the rotational speed of the electric motor further comprises changing a frequency of a drive signal output by the drive unit to the electric motor.

In any or all of the disclosed embodiments, the controller is further configured to detect an increase in power output after changing the frequency of the drive signal, and store the increased power output as a new power output set point.

In any or all of the disclosed embodiments, the aquifer storage and recovery system further comprises a regeneration module connected to the drive unit and comprising inverter circuitry configured to convert direct current supplied to the drive unit from the electric motor to alternating current.

In any or all of the disclosed embodiments, a direct current (DC) bus of the regeneration module is connected to a DC bus of the drive unit.

In any or all of the disclosed embodiments, the aquifer storage and recovery system further comprises a down well flow control valve in the well bore, and the controller is configured to operate the down well flow control valve to maintain pressure in the well bore at a pressure set point.

In any or all of the disclosed embodiments, the down well flow control valve is coupled to a sleeve and coupled to a one-way valve, the one-way valve being disposed within the sleeve, the pump is disposed below the down well flow control valve and is in fluid communication with the sleeve, and the sleeve and the one-way valve are configured such that water flow into an aquifer flows through the sleeve to the pump and bypasses the one-way valve, and water flow out of the aquifer flows into the sleeve, through the one-way valve, and into the down well flow control valve.

In any or all of the disclosed embodiments, the controller is further configured to determine a first theoretical power output of the electric motor based at least in part on a flow rate through the well bore, a water level in the source reservoir, a pressure in the well bore, a numerical constant associated with the aquifer storage and recovery system, or any combination thereof, determine a difference between the first theoretical power output and a previously stored theoretical power output, and control the rotational speed of the electric motor based at least in part on the difference between the first theoretical power output and the previously stored theoretical power output.

In any or all of the disclosed embodiments, the controller is further configured to update the power output set point based at least in part on a change in the power output of the electric motor.

In any or all of the disclosed embodiments, the controller is further configured to determine a first rotational speed of the electric motor and the pump, and operate the drive unit to control the electric motor such that it rotates at a second rotational speed that is less than the first rotational speed.

In another representative embodiment, a pumped-storage hydroelectric system can include the aquifer storage and recovery system of any of the embodiments described herein.

In another representative embodiment, a method comprises pumping water from an aquifer into the source reservoir with the aquifer storage and recovery system of any of the disclosed embodiments, wherein the electric motor is powered with electricity supplied by a renewable energy power plant.

In another representative embodiment, a method comprises, with an aquifer storage and recovery system comprising a well bore, a pump in fluid communication with the well bore, an electric motor coupled to the pump, and a drive unit configured to control operation of the electric motor, flowing water into the well bore such that the pump rotates in a reverse direction and drives the electric motor coupled to the pump in the reverse direction to operate the electric motor as a generator, determining a power output of the electric motor, determining a difference between the power output of the electric motor and a power output set point and, with the drive unit, controlling a rotational speed of the electric motor based at least in part on the difference between the power output of the electric motor and the power output set point.

In any or all of the disclosed embodiments, the method further comprises updating the power output set point based at least in part on a change in the power output of the electric motor.

In any or all of the disclosed embodiments, controlling the rotational speed of the electric motor further comprises varying a frequency of a drive signal output by the drive unit to the electric motor.

In any or all of the disclosed embodiments, the method further comprises detecting an increase in power output after changing the frequency of the drive signal and storing the increased power output as a new power output set point.

In any or all of the disclosed embodiments, flowing water into the well bore further comprises maintaining a pressure in the well bore at or above a pressure set point.

In any or all of the disclosed embodiments, the method further comprises, prior to determining the power output of the electric motor, determining a rotational speed of the electric motor, and with the drive unit, outputting a drive signal having a frequency matched to the rotational speed of the electric motor.

In any or all of the disclosed embodiments, the method further comprises reducing the frequency of the drive signal.

In any or all of the disclosed embodiments, the method further comprises determining a change in a theoretical power output of the aquifer storage and recovery system, and varying a frequency of a drive signal output to the electric motor by the drive unit.

In any or all of the disclosed embodiments, the method further comprises varying a position of a flow control valve disposed in the well bore to maintain a pressure in the well bore at a pressure set point.

In another representative embodiment, an aquifer storage and recovery system comprises a pump disposed in a well bore, an electric motor coupled to the pump, a drive unit configured to control operation of the electric motor, a down well flow control valve disposed in the well bore and in fluid communication with the pump, and a controller configured to flow water into the well bore from a source reservoir through the pump such that the pump rotates in a reverse direction and drives the electric motor coupled to the pump in the reverse direction to operate as a generator. The controller is further configured to operate the down well flow control valve to maintain pressure in the well bore at a pressure set point, determine a power output of the electric motor, determine a difference between the power output of the electric motor and a power output set point, and operate the drive unit to control a rotational speed of the electric motor based at least in part on the difference between the power output of the electric motor and the power output set point.

The foregoing features and advantages of the disclosed technology will become more apparent from the following figures and detailed description.

DETAILED DESCRIPTION

Figure 1:
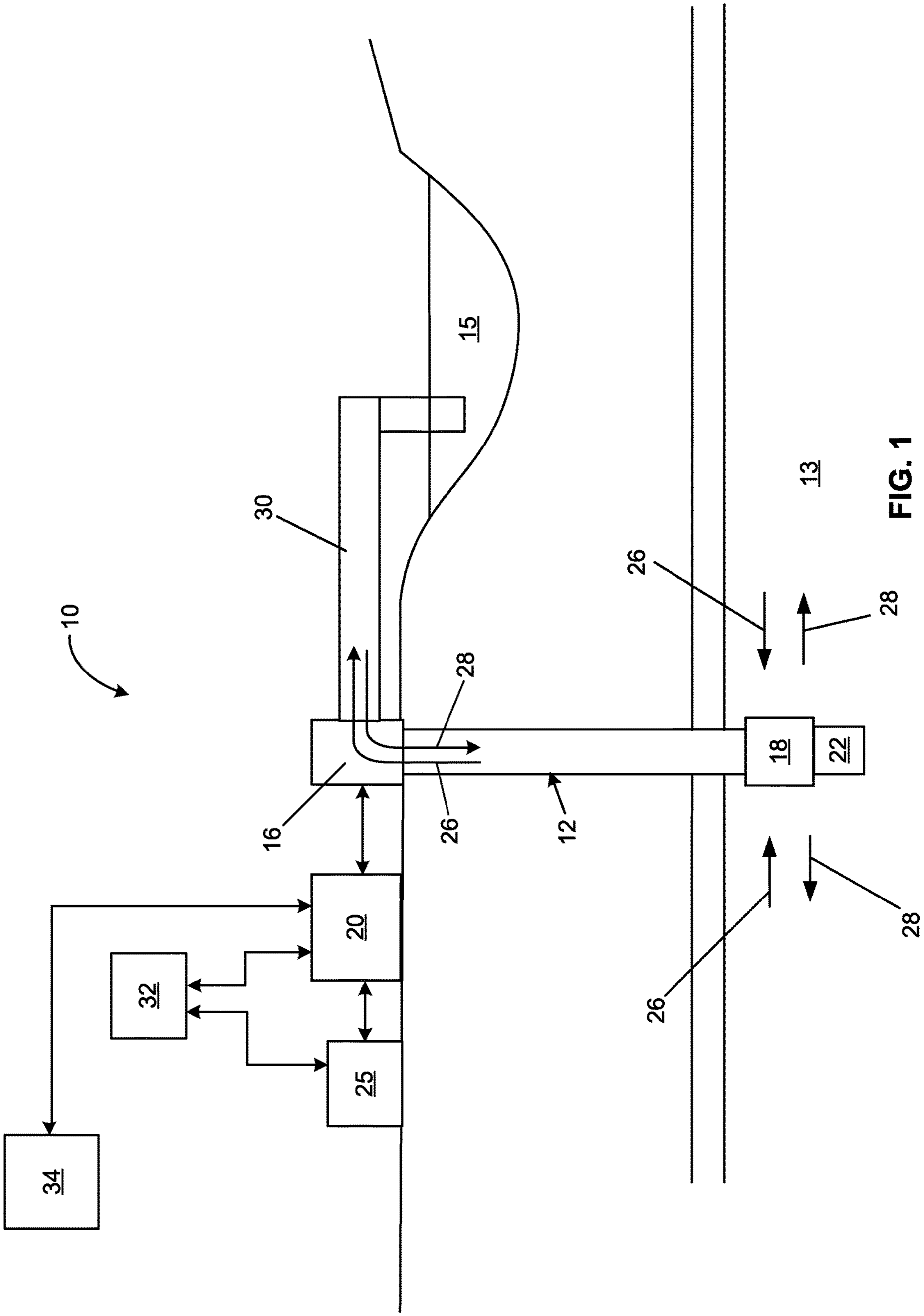
FIG. 1 is a schematic diagram of an aquifer storage and recovery system, according to one embodiment.

Disclosed herein are systems and methods of generating electricity using aquifer storage systems and/or aquifer storage and recovery systems. Pump systems can be configured to recover ground water from an aquifer through a well bore for use in, for example, irrigation. During periods where water is available, the pump system can be used to pump/flow water back into the aquifer to "recharge" the aquifer for later use. During recharging, the pressure head developed in the well pipe(s) between the water reservoir/source and the aquifer can be used to generate electricity.

For example, in certain embodiments an aquifer storage and recovery (ASR) system can include a pump, a motor (e.g., an electric motor comprising a rotor and a stator) coupled to the pump, a drive unit or drive circuitry such as a variable frequency drive (VFD) configured to operate/drive the motor, and a controller. When water is withdrawn from the aquifer, the controller can operate the VFD to output a drive signal to operate the electric motor in a first direction. This, in turn, can drive the pump in the first direction to withdraw water from the aquifer through the well bore. When water is supplied to the aquifer, the pressure in the well column can cause the pump to rotate in a second, reverse direction, thereby causing the motor to rotate in the second direction. By controlling the voltage and/or frequency of the drive signal output by the VFD to the electric motor, the electric motor can be operated as a generator to generate electricity. The amount of power generated by the electric motor can also be controlled by varying the drive signal output by the VFD. The drive signal can be varied based on a variety of parameters associated with the ASR system, such as the flow rate, the water level in the supply reservoir, the pressure in the well column, one or more constants associated with the system, etc. In certain embodiments, the excitation voltage provided to the motor/generator can also be controlled.

In certain embodiments, the systems described herein can be configured to determine a theoretical power output of the electric motor based on one or more of the parameters above. In certain embodiments, the systems can be configured to initiate a routine to control/vary a drive signal of the VFD to optimize power generation by the electric motor when the theoretical power production varies from a previously stored theoretical power production value by greater than a specified threshold. For example, when a theoretical power production value at time T2 based on any of the parameters above (e.g., as measured by sensors in the system) varies from a theoretical power production value previously determined at time T1, the system can control or vary the drive signal outputted by the VFD to establish a new power output set point.

The controller can take any combination of the steps outlined in the following examples to optimize/maximize the current induced in the windings of the electric motor. The controller can further operate the valves, the VFD, the pump, the motor, and/or the regeneration module to modify parameters of the generated current (e.g., the wave form, the voltage etc.), and/or modify the amount of current/power generated, depending upon factors such as the flow rate through the well column, the pressure head in the well column, a set point corresponding to a specified power to be generated, etc., and deliver the power to a load or to an electric grid. In particular embodiments, the controller can adjust various parameters to maximize power generation while maintaining positive pressure in the well head. In certain embodiments, a pressure set point in the well column (e.g., at the well head) can be maintained regardless of flow rate (e.g., by operation of the down well flow control valve) while power generation occurs. This can prevent entrainment of air in the well column and subsequent injection of air into the aquifer, which can plug the aquifer.

In certain embodiments, the ASR systems and methods described herein can be used to provide pumped-storage hydroelectric generation capacity to store excess energy from renewable power sources such as photovoltaic cells and/or wind turbines when the power generated by the renewable sources exceeds demand. For example, during periods of relatively high renewable power production and relatively low power demand, the systems described herein can be operated to pump water from an aquifer into a storage volume or reservoir above (e.g., at a higher elevation than) the aquifer. During periods of relatively high power demand, the water can be reinjected into the aquifer to generate electricity and supplement the renewable power sources, which may have intermittent or cyclical periods of power production that do not necessarily coincide with periods of peak power demand. In certain embodiments, electricity produced using the system and methods described herein can be used to power loads (e.g., machinery) on the ASR system premises, and/or can be stored in a storage medium such as a battery, a heat sink, etc., for later use.

Example 1: Aquifer Storage and Recovery System

Figure 17:
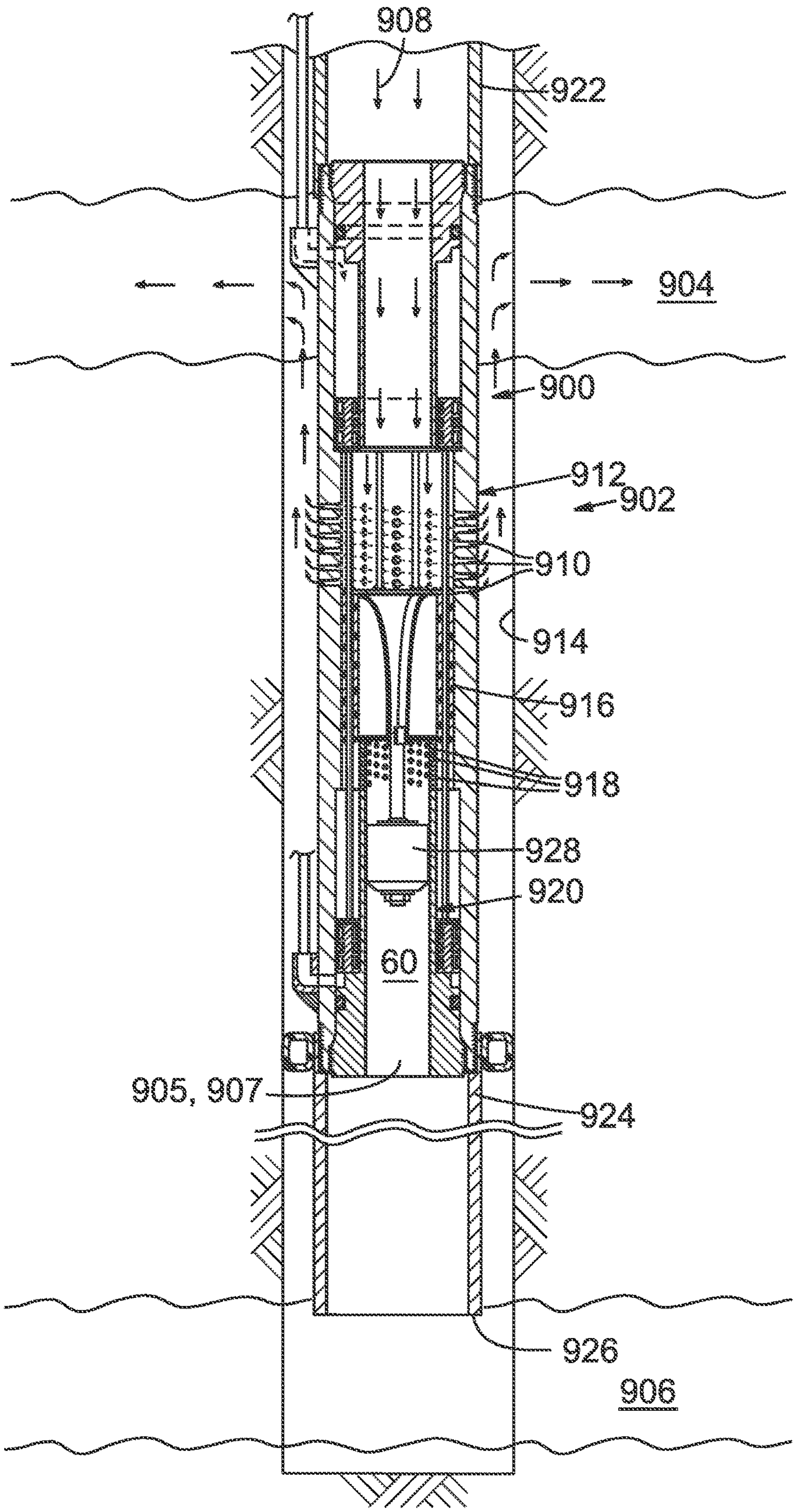
FIGS. 17-19 illustrate representative examples of down well flow control valves that can be used in combination with the systems described herein.
Figure 18:
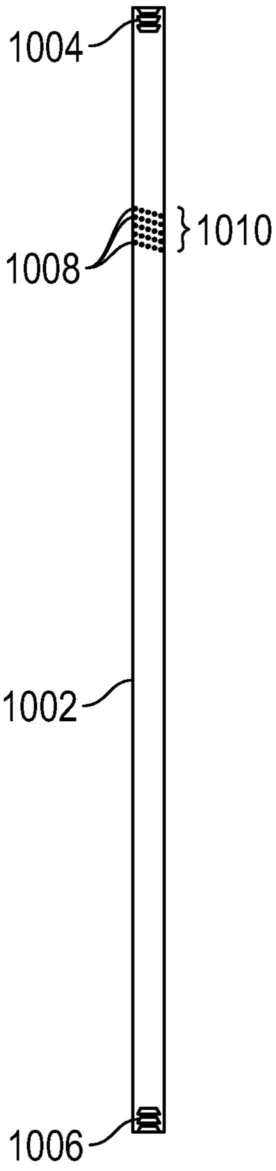
Figure 19:
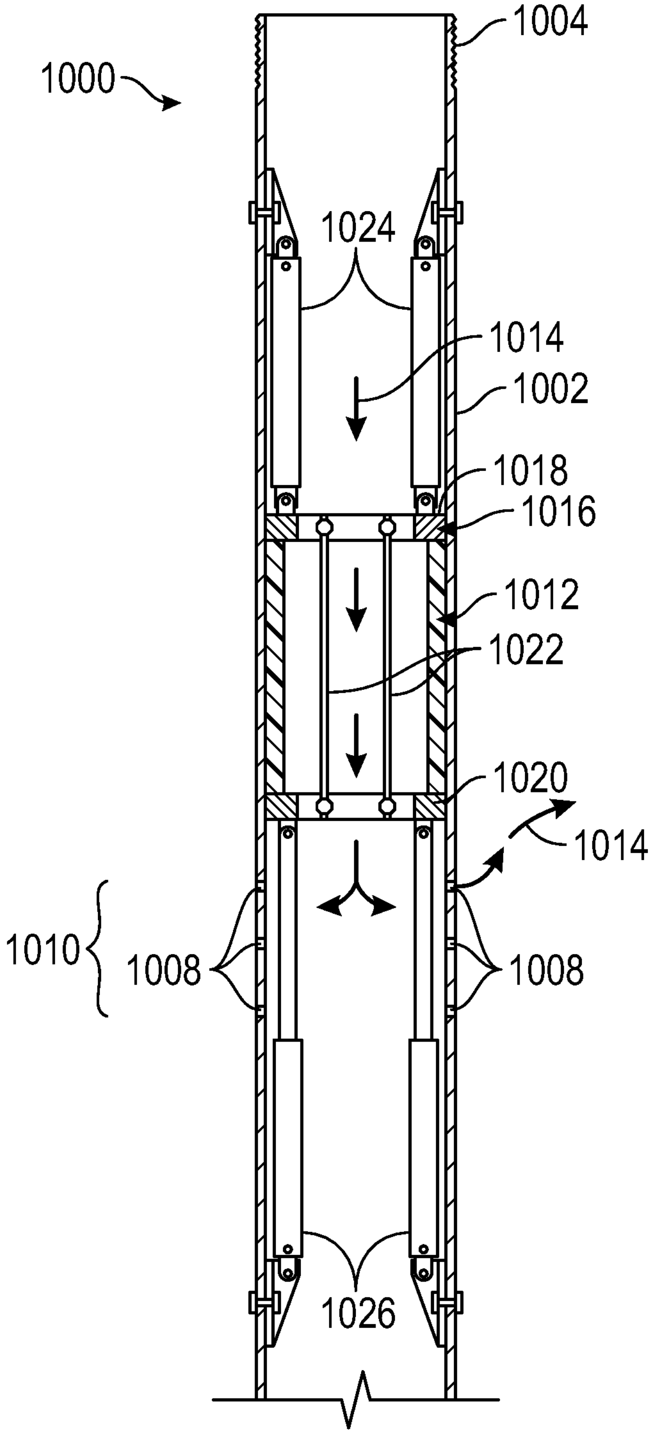

FIG. 1 schematically illustrates an exemplary aquifer storage and recovery (ASR) system 10, according to one embodiment. As shown, the system 10 can comprise a well column/bore 12 extending from a surface side or ground surface to a subterranean reservoir or aquifer 13. The well bore 12 can be in fluid communication with a water supply or reservoir 15, which can be a surface water body such as a pond, lake, marsh, storage tank, etc., or a natural or manmade subterranean formation such as a shallow aquifer relatively close to the ground surface, a buried storage tank/volume, etc. The system 10 can further comprise an electric motor 16 at a first/upper end of the well bore 12 (e.g., above ground) and a pump 18 at a second/lower end of the well bore 12 (e.g., underground in the aquifer 13) and coupled to the pump (e.g., by a drive shaft), although other configurations are possible. In certain embodiments, the pump 18 can be in fluid communication with the reservoir 15 by a conduit or pipe 30. The well bore 12 can comprise a flow control device/valve 22 disposed in the well bore. The flow control valve can be located anywhere in the well column, for example below the pump 18, above the pump 18, at the lower end of the well column, at the top of the well column, etc. In the illustrated embodiment, the flow control valve 22 is located below the pump 18 and is referred to hereinafter as a down well flow control valve. The down well flow control valve 22 can be configured to control the flow rate into the aquifer though the well bore. In certain embodiments, the down well flow control valve 22 can be movable between a closed position (e.g., 0% open) and a fully open (e.g., 100% open), and can be continuously variable to any position therebetween to vary the flow rate through the well bore. FIGS. 17-19 illustrate representative embodiments of down well flow control valves that can be used in combination with the systems described herein.

In certain embodiments, the pump 18 can be any of various dynamic pumps such as a centrifugal pump, or any of various positive displacement pumps such as a piston pump, a peristaltic pump, a diaphragm pump, or a gear pump, to name a few. In particular embodiments, the pump 18 can be a centrifugal pump such as a turbine pump, for example a vertical turbine pump or a submersible turbine pump. The turbine pump can comprise one or a plurality of rotary pumping elements such as rotors or turbines.

The system 10 can also comprise motor drive circuitry, which in certain embodiments can be a drive unit configured as a variable frequency drive (VFD) 20. The VFD 20 can be configured to produce/output a drive signal to the electric motor 16 to drive the pump 18 when operating in a pumping mode, and to operate the electric motor as an electric generator in a generating mode/regenerating mode when the pump is driven by water pressure in the well column, as further described below.

In certain embodiments, the system 10 can include additional power electronics such as inverters, rectifiers, pulse width modulation (PWM) control modules, etc. For example, in certain embodiments the system 10 can comprise regeneration circuitry schematically illustrated as a regeneration module 25. In certain embodiments, the regeneration module 25 can comprise rectifier circuitry configured to convert direct current (DC) to alternating current (AC) for transmission to an electrical source generally indicated at 34, such as an electric utility. In certain embodiments, the regeneration module 25 can be connected to the VFD 20, for example, by a common DC bus. The regeneration module 25 is described in greater detail with reference to FIG. 3 below.

The system can be operable in a pumping mode to withdraw water from aquifer 13 and in a regeneration mode to generate power by injecting water into the aquifer. In certain embodiments, the system 10 can comprise a control module/controller/programmable logic controller (PLC) indicated schematically as a controller 32 in communication with the VFD 20 and/or the regeneration module 25. The controller 32 can be configured to transmit control signals to the VFD 20, the motor 16, the regeneration module 25 and/or other components of the system to direct/control operation of the system in the pumping mode and in the regeneration mode.

As noted above, in certain embodiments the VFD 20 and/or the regeneration module 25 can be connected to the electrical source 34, and can be configured to draw power from the electrical source 34 or supply power to the electrical source 34 depending upon whether the system is operating in the pumping mode or the regeneration mode. In certain embodiments, the electrical source 34 can also be an electrical load (e.g., machinery such as an electric motor, etc.) or an energy storage system such as a battery.

Figure 2:
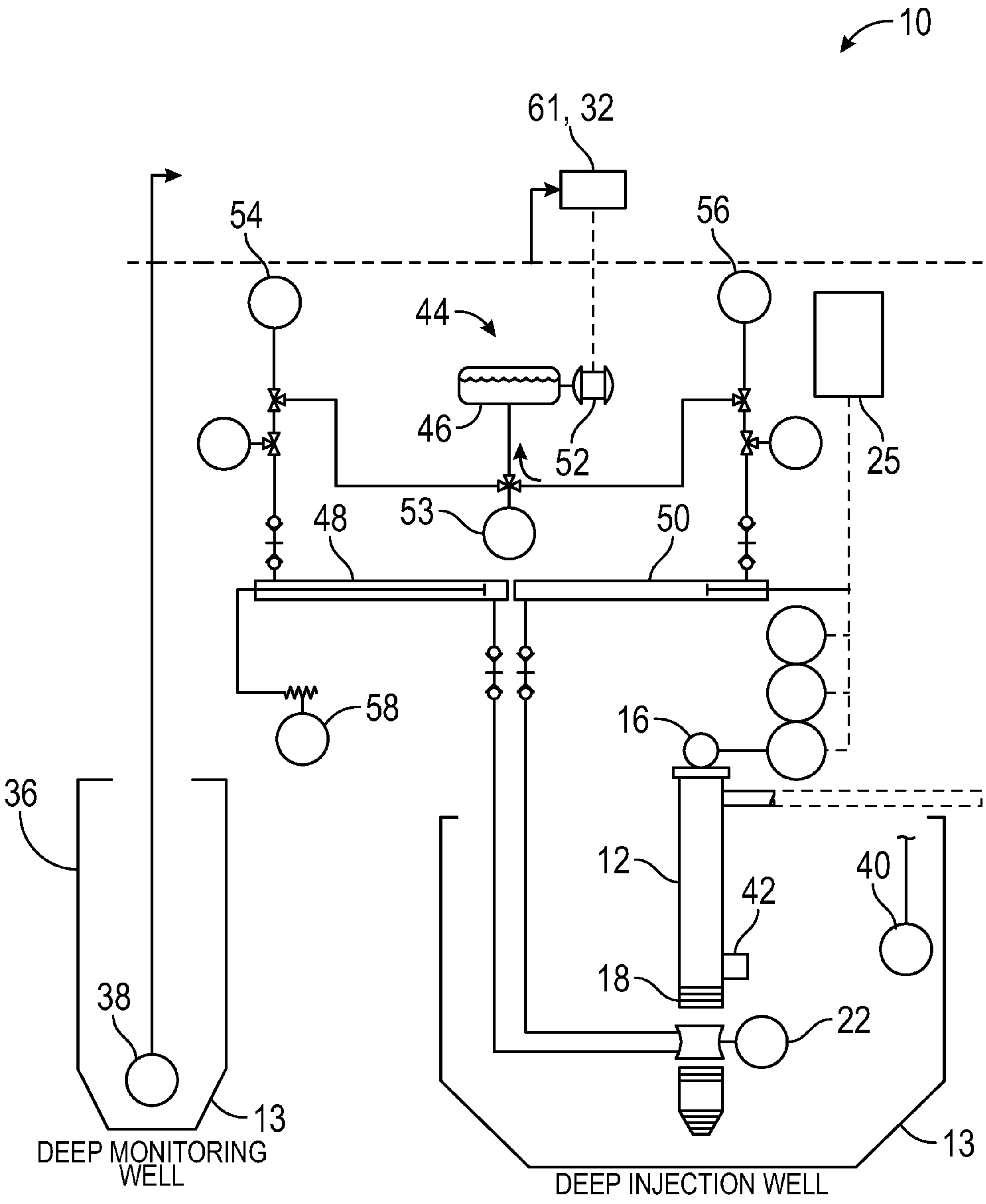
FIG. 2 is another schematic diagram of the aquifer storage and recovery system of FIG. 1 illustrating a hydraulic system for operating a down well flow control valve.

In certain embodiments, the controller 32 can be in communication with a variety of sensors, transducers, and/or actuators, which can provide data to the controller and/or allow the controller to actuate elements of the system such as valves, etc. The sensors/transducers/actuators can be above ground, underground, in the well column 12, and/or in one or more separate well bores in communication with the aquifer 13. For example, FIG. 2 schematically illustrates a particular implementation of the system 10 which includes a second well bore 36 separate from the well bore 12 and configured as a monitoring well. An aquifer level/water level transducer 38 can be disposed in the well bore 36, and can be configured to transmit data of the water level in the aquifer 13 to the controller 32. A second water level transducer 40 can be located in the well bore 12, for example, adjacent the down well flow control valve 22. In certain embodiments, the controller 32 can be configured to compare the water level in the aquifer as measured by the transducer 40 with the water level measured by the transducer 38, which can be isolated from the effects of water entering or exiting the aquifer through the well bore 12, to determine the overall water level in the aquifer 13.

The system 10 in FIG. 2 can further comprise a pressure sensor schematically shown at 42 located in the well bore 12. The pressure sensor 42 can be configured to transmit data of the water pressure in the well bore 12 to the controller 32. The pressure sensor 42 can be located above the pump 18, at the level of the pump 18, below the pump 18, and/or above, below, or at the level of the down well flow control valve 22. In certain embodiments, the system 10 can comprise multiple pressure sensors at any combination of these locations, or at all of these locations, depending upon the particular requirements of the system.

The system 10 can also include a hydraulic system 44 configured to control the position of the down well flow control valve 22. For example, in the illustrated embodiment the hydraulic system 44 can comprise a hydraulic fluid reservoir 46 in fluid communication with two hydraulic pistons 48 and 50. The hydraulic pistons 48 and 50 can be controlled (e.g., by the controller 32) to provide pressurized hydraulic fluid to the down well flow control valve 22 to control the position of the down well flow control valve. A hydraulic actuator motor 52 can pressurize the hydraulic fluid, which can be distributed to the pistons by a valve block indicated at 53. Pressure transducers 54 and 56 can determine the pressure of the hydraulic fluid supplied to the pistons 48 and 50. The position of the pistons 48, 50 can be determined by one or more linear potentiometers or other transducers such as potentiometer 58. In certain embodiments, the controller 32 can determine a position of the down well flow control valve 22 based at least in part on the position of the hydraulic pistons as indicated by the linear potentiometer 58, the pressure of the hydraulic fluid as indicated by the pressure transducers 54 and 56, etc. Data from the various sensors, transducers, etc., can be transmitted via various application interfaces to the controller 32, which can have a supervisory control and data acquisition (SCADA) architecture indicated at 61.

The controller 32 can also be in communication with a variety of sensors associated with the electric motor 16 and/or the VFD 20, such as voltage and/or current sensors. The controller 32 can be configured to control operation of the various components of the system such as the VFD 20, the electric motor 16, the down well flow control valve 22, various ancillary pumps and valves, etc., based at least in part on data provided by one or more of the sensors above to vary power production by the electric motor in the generating mode, as further described below.

Figure 3:
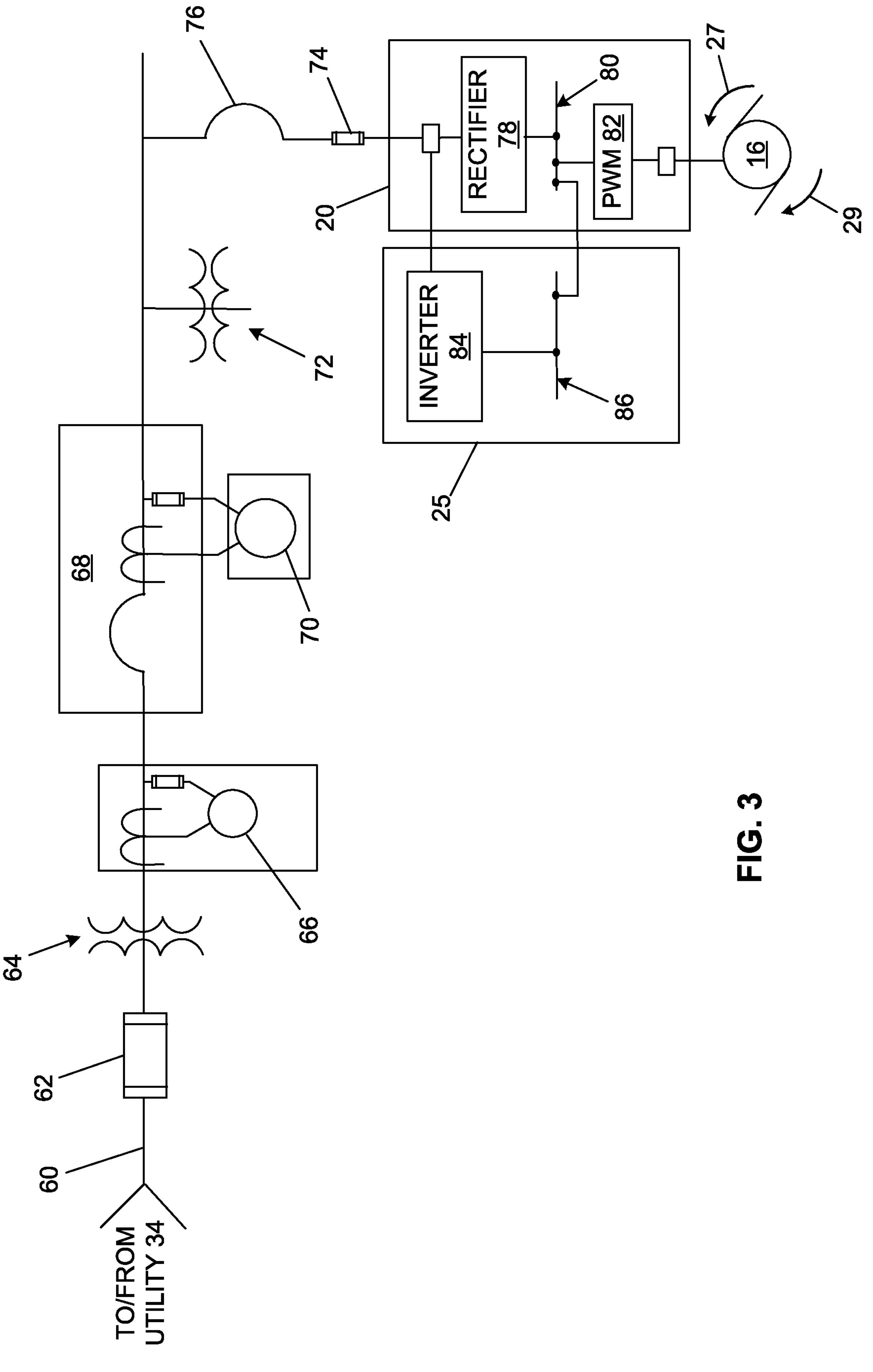
FIG. 3 is a single-line diagram of electrical components of the system of FIG. 1, according to one embodiment.

In certain embodiments, the electric motor 16 and associated components can be configured as a three-phase system (however, the system can include any number of phases). FIG. 3 illustrates a single-line diagram of the electrical connections between selected components of the system 10. Beginning at the left side of FIG. 3, an electric connection line 60 to the electric source/utility 34 can pass through a fuse 62 to a transformer 64 (e.g., a high/medium voltage to low voltage transformer) (e.g., 600 VAC or less). A utility meter 66 can be connected to the electrical line 60 between the transformer 64 and a main disconnect 68. In certain embodiments, the main disconnect 68 can be a circuit breaker with long time, short time instantaneous trip settings and ground (LSIG) fault protection. In certain embodiments, the main disconnect 68 can comprise a phase and/or voltage monitoring relay 70. A control transformer 72 (e.g., 480 VAC to 120/240 VAC) can be connected in parallel with the VFD 20. The VFD 20 can be connected to the line 60 in series with a fuse 74 and a disconnect/circuit breaker 76 (e.g., with LSI or LSIG settings).

As noted above, the electric motor 16 can be connected to the VFD 20. In the illustrated embodiment, the VFD 20 can comprise an AC-DC rectifier module 78 connected to a DC bus indicated at 80. In certain embodiments, the DC bus 80 can comprise a plurality of capacitors. The DC bus 80 can be connected to a PWM module 82, which can provide current to the motor 16 at the selected output frequency of the VFD 20.

The regeneration module 25 can comprise a DC-AC inverter module 84 with inverter circuitry connected to a DC bus 86. The DC bus 86 of the regeneration module 25 can be connected to the DC bus 80 of the VFD 20. The inverter module 84 can be connected to the line 60 in parallel with the rectifier module 78 of the VFD 20.

Example 2: Control Diagram

Figure 4:
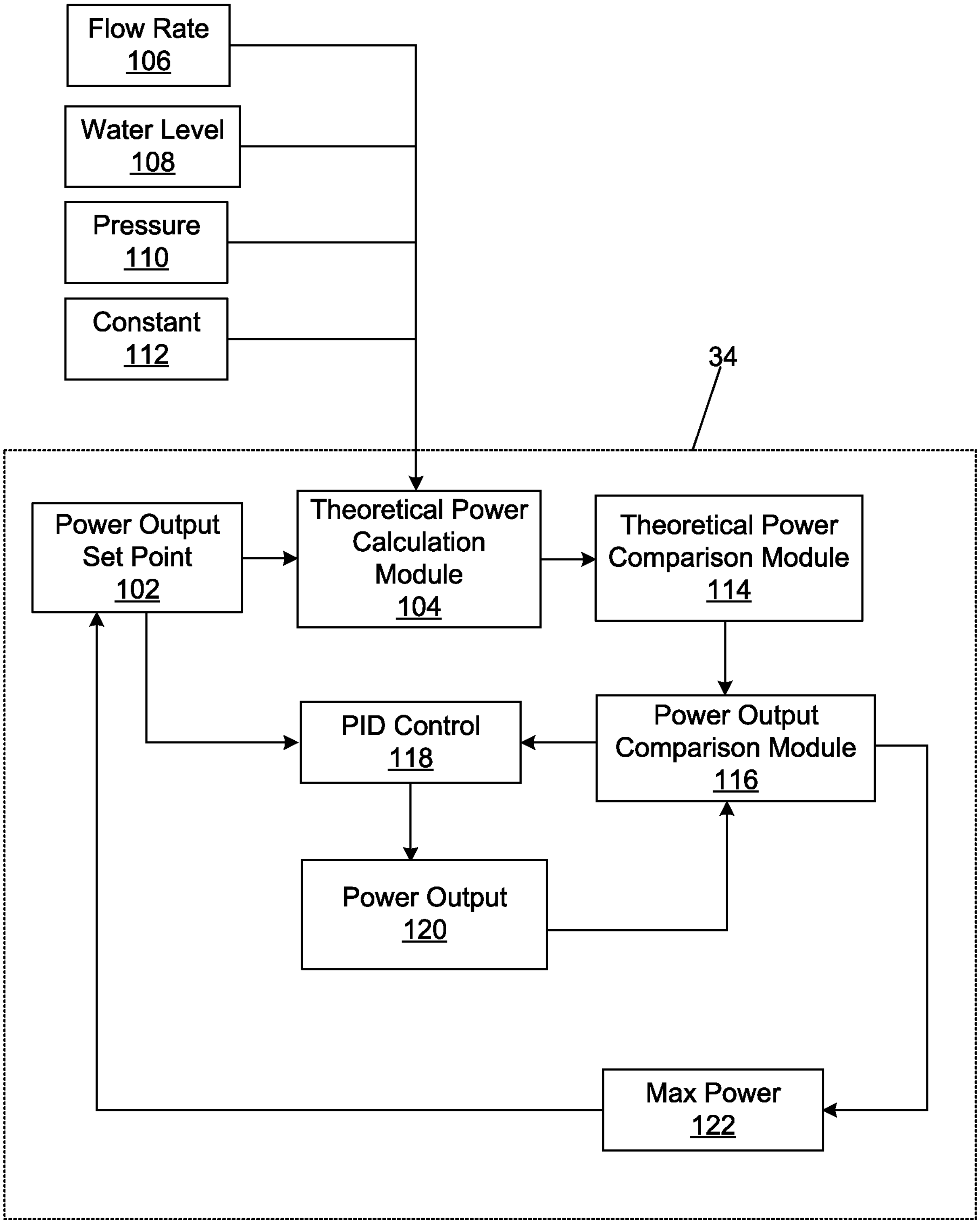
FIG. 4 is a schematic block diagram of a representative embodiment of a control system.

FIG. 4 is schematic block diagram of a representative control system for implementing the power generation methods described herein when the system is operating in the regeneration mode. At block 102, a power output set point can be provided. In certain embodiments, the power output set point 102 can be an actual power output of the electric motor 16 operating in the regeneration mode. The power output set point 102 can be provided to a proportion-integral-derivative (PID) control module 118, which can be configured to apply one or more of proportional, integral, and/or derivative control (referred to herein as "PID control") to the output frequency/drive signal of the VFD 20. The power output 120 generated by the electric motor 16 can be determined and transmitted to a power output comparison module 116, which can be in communication with the PID control module 118. The power comparison module 116 can be configured to determine whether a current power output of the electric motor 16 in the regeneration mode is less than, equal to, or greater than the power output set point 102. In certain embodiments, when the power output comparison module 116 determines that the current power output of the electric motor is greater than the power output set point 122, the current power output can be the maximum power output 122 of the electric motor 16 under the flow conditions, and the maximum power output 122 can be stored as a new power output set point as described in greater detail below.

The power output set point 102 can also be provided to a theoretical power calculation module 104. The theoretical power calculation module 104 can determine/calculate a theoretical power output of the electric motor 16 based at least in part on a variety of parameters including one or more of a flow rate 106, a water level 108 (e.g., in the reservoir 15), a pressure 110 (e.g., in the well column 12), the height of the well column, the density of the liquid, and/or a numerical constant 112 associated with the system 10. For example, in certain embodiments the theoretical power output can be determined with the following equation, where the constant can be the numerical constant 112. The various parameters can be provided by one more of the sensors and/or transducers described above with reference to FIG. 2.

$$\text{Theoretical Power Output} = \frac{1}{2}\frac{\text{Flow Rate} \times \text{Total Dynamic Head}}{\text{Numerical Constant}}$$

In certain embodiments, the total theoretical power (e.g., horsepower) of the system can be calculated by multiplying the flow rate by the total dynamic head of the system, and dividing by the system constant 112. In certain embodiments, the total dynamic head can be determined by adding the static height (also known as the discharge head) of the well column pipe, the static lift (also known as the suction head) of the pump, and the friction loss or head loss of the well column pipe.

In certain embodiments, the theoretical power calculation module 104 can be configured to recalculate/determine the theoretical power output of the system periodically after the passage of a specified time period (e.g., 5 seconds, 10 seconds, 30 seconds, 1 minute, 3 minutes, 5 minutes, 10 minutes, etc.), and/or upon detecting a change in one or more of the input parameters. The module 104 can transmit the theoretical power output values to a theoretical power output comparison module 114, which can compare a most recent theoretical power output with one or more earlier theoretical power outputs. The power output comparison module 116 can be in communication with the theoretical power comparison module 114. In certain embodiments, when the theoretical power output module 114 determines that the theoretical power output of the electric motor has changed, this data can be provided to the power output comparison module 116, which can check whether the current power output is greater than the power output set point and initiate variation/control of the drive signal by the PID control module 118.

Example 3: Regeneration Mode Operation of ASR System

Referring again to FIG. 1, during pumping operation (e.g., in the pumping mode), the VFD 20 can operate the electric motor 16 to drive the pump 18 in a first direction or pumping direction to pump water out of the well or aquifer 13, as shown by arrows 26. Rotation of the electric motor 16 in the first direction is indicated by arrow 27 in FIG. 3. Electric current from the utility 34 can be provided to the electric motor 16 via the VFD 20, which can output a drive signal at a specified voltage, current, and/or frequency to the motor.

During recharging or storage operation (e.g., in the regeneration mode), water from the reservoir/source 15 can be fed back into the aquifer 13 through the well column 12, as indicated by arrows 28 in FIG. 1. In certain embodiments, the pressure in the well bore 12 can be sufficiently high to operate/rotate the pumping elements of the pump 18 in a second direction or reverse direction indicated by arrow 29 in FIG. 3. Rotation of the pumping elements can cause corresponding rotation of the rotor of the electric motor 16, which can induce an electric current in the stator of the motor 16. By adjusting one or more of the frequency, voltage, and/or current of the drive signal applied to the stator by the VFD 20, electric current (e.g., direct current) can be developed or generated in the VFD 20 (e.g., on the DC bus 80). The inverter 84 of the regeneration module 25 can then convert the DC current to alternating current (AC) for transmission to, for example, the power utility 34. In certain embodiments, the power supplied to the power utility 34 can be measured/recorded by the meter 70 (FIG. 3). In certain embodiments, the generated power can be stored for later use (e.g., in a battery, heat sink, or other energy storage media). In certain embodiments, the generated power can be used to power other loads (e.g., electric motors/pumps or other machinery).

Figure 5:
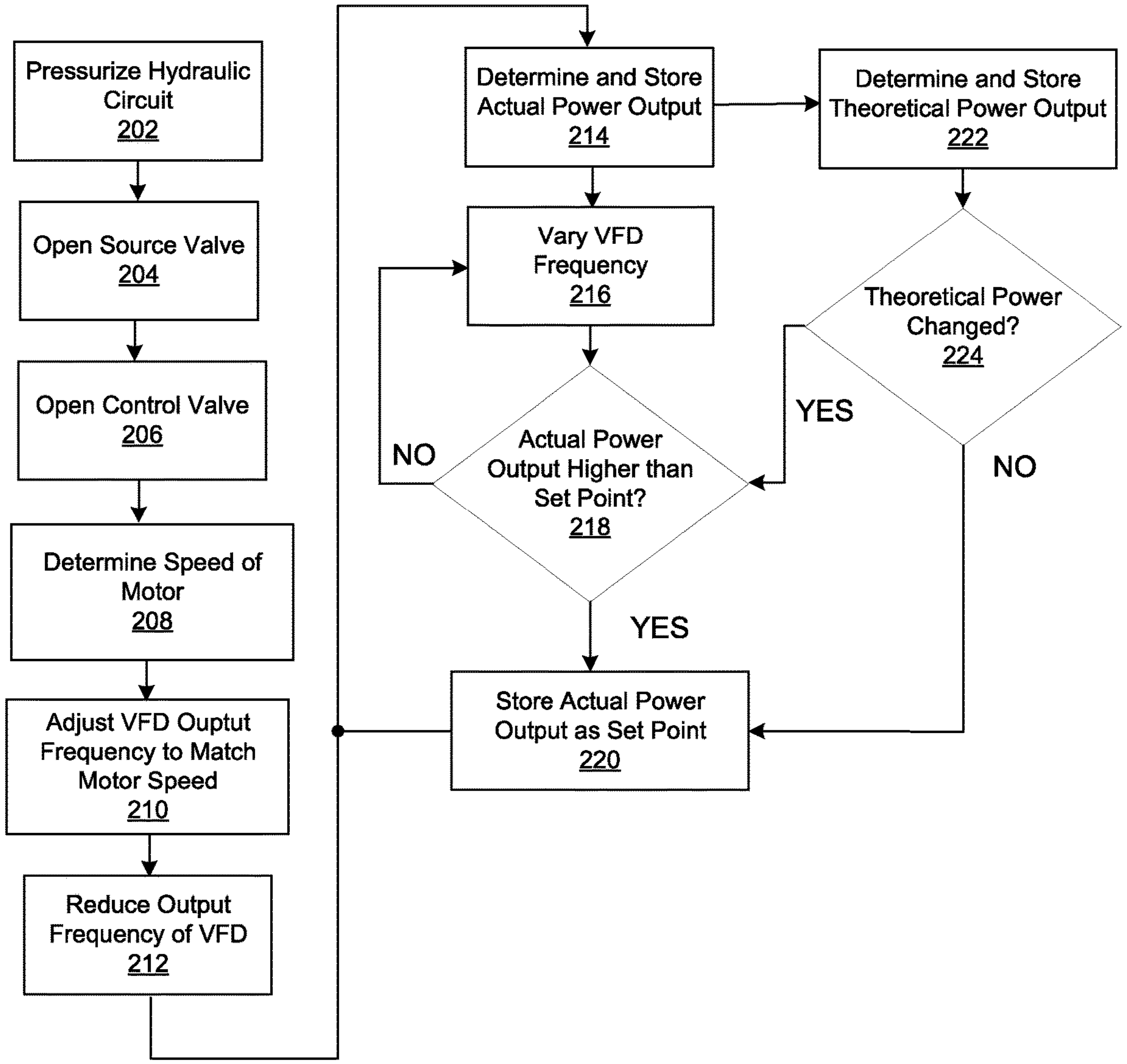
FIG. 5 is a process flow diagram of a representative method of generating electricity with the system of FIG. 1.

FIG. 5 illustrates a representative method of operating the system 10 in the regeneration mode to generate electricity when supplying water to the aquifer 13. At process block 202, the controller 32 can close the down well flow control valve (e.g., down well flow control valve 22) by transmitting control signals to pressurize the hydraulic circuit/system 44 (FIG. 2). After the controller 32 determines that the down well flow control valve 22 is fully closed, it can transmit control signals to open a source water supply valve at the well head at process block 204. This can provide water to the well bore 12, pressurize the well bore, and force out any air in the well bore pipe. At process block 206, when the controller 32 determines that the water flow going into the well bore has stopped and the pressure in the well bore has reached a set point, the controller 32 can transmit control signals to the hydraulic system 44 to open the down well flow control valve 22 to allow water to flow into the aquifer at a target flow rate. The target flow rate or flow rate set point can be programmed by an operator, or selected by the controller 32 based on one or more criteria, such as maintaining positive pressure (e.g., pressure greater than atmospheric pressure, greater than 0 psi, etc.) at the top of the well head. In certain embodiments, maintaining positive pressure in the well bore can prevent entrainment of air in the water flowing through the well bore, which can plug the aquifer.

As water flows through the pump 18 into the aquifer 13, it can cause the pump bowls/pumping elements to turn in the second/reverse direction (arrow 29 in FIG. 3). At process block 208, once the controller 32 determines that water is flowing through the well bore 12 at the flow rate set point and that the pressure in the well column is at the pressure set point, the controller can determine the rotational speed (e.g., RPM) of the electric motor 16 (e.g., of the rotor). At process block 210, the controller 32 can transmit control signals to the VFD 20 to output a drive signal having a frequency that matches or corresponds to the rotational direction and speed of the electric motor 16. Thus, in certain embodiments the controller 32 can command the VFD 20 to turn in the reverse direction and at the same speed/frequency as the electric motor 16.

At process block 212, the controller 32 can transmit control signals to the VFD 20 to output a drive signal at a lower rotational speed/frequency than a natural/unloaded rotational speed/frequency of the pump at the selected flow rate and pressure. For example, the controller 32 can command the VFD 20 to output a drive signal with a frequency that is lower than the rotational speed/frequency at which the pump 18 would otherwise drive the electric motor 16 under the flow conditions. This can create a load on the pumping elements such that the pump operates as a water turbine, resulting in electric current generation in the windings of the electric motor 16.

In certain embodiments, the controller 32 can vary any of a variety of parameters of the system to maximize power output, such as the flow rate, pressure, rotational speed of the pump, the frequency of the VFD drive signal, etc. For example, referring to FIGS. 4 and 5, in the illustrated embodiment the controller 32 can determine a first power output/actual power output (e.g., watts or kilowatts) of the electric motor 16 at process block 214, and store it in a memory. In certain embodiments, the initial power output can be stored as the initial power output set point 102 (FIG. 4). At process block 216, the power output of the electric motor 16 can be provided to the PID control module 118, which can apply any of proportional, integral, and/or derivative control to increase or decrease the frequency of the drive signal output by the VFD 20.

At process block 218, the power output comparison module 116 can determine a difference between the power output of the electric motor 16 and the power output set point 102. For example, in certain embodiments the power output comparison module 116 can determine whether the power output of the electric motor 16 is higher or lower than the power output set point 102, as illustrated in FIG. 5. In certain embodiments, the power output comparison module 116 can determine a numerical difference between the power output of the electric motor 16 and the power output set point 102. Based at least on the difference, which can include the determination that a difference exists, the controller 32 can control/vary the drive signal (e.g., vary the frequency of the drive signal) output by the VFD 20 and measure/determine the power output of the electric motor with the modified drive signal. In the illustrated embodiment, if the power output is lower, this information is provided to the PID control module 118 as feedback and the drive signal frequency is varied accordingly. If the power output is higher than the power output set point 102, the increased power output is stored as a new power output set point at block 220 (e.g., the power output set point is updated), and the routine returns to process block 214.

Meanwhile, the controller 32 can execute a parallel routine at process blocks 222 and 224. At process block 222, the theoretical power calculation module 104 can determine a theoretical power output of the electric motor 16 based at least in part on, for example, the flow rate 106 through the well column 12, the water level 108 in the reservoir 15 and/or in the aquifer 13, the pressure 110 in the well bore 12, and/or the numerical constant 112 associated with the system 10, and store the theoretical power output in a memory. The theoretical power calculation module 104 can update the theoretical power output based on data of the various parameters above. For example, the theoretical power calculation module 104 can determine a second theoretical power output, such as after the passage of a specified time period (e.g., 5 seconds, 10 seconds, 30 seconds, 1 minute, 3 minutes, 5 minutes, 10 minutes, etc.). The theoretical power comparison module 114 can then compare the second theoretical power output with the first (previously stored) theoretical power output and determine whether the second theoretical power output varies from the first theoretical power output by a specified threshold/amount (e.g., 1%, 2%, 3%, 5%, 10%, etc.). If the second theoretical power output does not differ from the first theoretical power output by the specified threshold, the controller 32 can retain the power output set point 102 in the memory, and returns to process block 214 (e.g., indicating that the current power output is at or near the maximum power output for the flow conditions). If the second theoretical power output differs from the first theoretical power output by the specified threshold or more, the controller 32 can proceed to process block 218 and adjust the drive signal.

This process can be repeated as the aquifer 13 fills and the reservoir 15 drains. In certain embodiments, the power output set point 102 can be reset, either as a VFD drive signal frequency is determined that results in power output (e.g., maximum power output 122) that is higher than the current set point, or as flow conditions change as determined by input from the various sensors and/or the theoretical power output calculation module 104.

Referring again to FIG. 3, as the controller 32 executes the routine above, the power generated in the windings of the electric motor 16 can be placed onto or transmitted to the DC bus 80 of the VFD 20. The electricity can then flow to the DC bus 86 of the regeneration module 25, which can be connected to the DC bus 80 of the VFD 20. The inverter module 84 of the regeneration module 25 can then convert the DC current from the DC bus 86 to AC current and supply the alternating current to the utility 34 (or to another load).

In certain examples, the controller 32 can also adjust other parameters instead of, or in addition to, the drive signal frequency. For example, in certain embodiments the controller 32 can vary one or more of the flow rate through the well bore, the pressure in the well bore, the rotational speed of the motor, the drive signal voltage, the excitation voltage provided to the motor windings, etc., and determine the power output of the motor. The controller 32 can iteratively adjust one or more of the parameters above and determine if a change produces more or less power. For example, if the controller 32 determines that by allowing the motor to spin faster more power is produced, then the controller can repeat the test by incrementing one or more parameters (e.g., flow rate, pressure, rotational velocity, voltage, frequency, etc.) to see if the same result occurs again. This power output determination and parameter adjustment process can run in a continuous loop seeking maximum power production and/or a selected power generation target.

In other embodiments, the controller 32 can vary the frequency of the VFD drive signal (or any of the parameters described herein) when the actual/instantaneous power output of the electric motor falls below the power output set point by a specified threshold. In yet other embodiments, the controller 32 can determine a difference between the theoretical power output and the actual power output of the electric motor, and vary the VFD drive signal (or any of the other parameters described herein) as described above to reduce the difference between the theoretical power output and the actual power output (e.g., to try to generate the theoretical power output).

Example 4: Energy Storage Applications of ASR

The ASR systems and methods described herein can be used in a variety of settings/applications to generate and/or store electrical energy, and/or store thermal energy. For example, in certain embodiments ASR systems and the control methods described herein can be used in combination with power plants, such as renewable power plants/sources including wind turbines/wind farms, photovoltaic cells/power stations such as solar farms, etc., to store energy when electrical power production exceeds demand. Such systems can be known as aquifer pumped-storage hydroelectric systems, or "aquifer pumped hydro" (APH) systems. Energy can be stored by using the electrical power from a renewable power plant to pump water from a relatively deep aquifer into a storage reservoir, such as a relatively shallow alluvial well/aquifer, a natural or manmade above-ground or underground reservoir, etc. During periods where power demand exceeds production from the renewable power plant, energy can be recovered by injecting water from the reservoir into the deep aquifer and operating the pump/motor combination in the regeneration mode as described herein to generate electricity.

Figure 6:
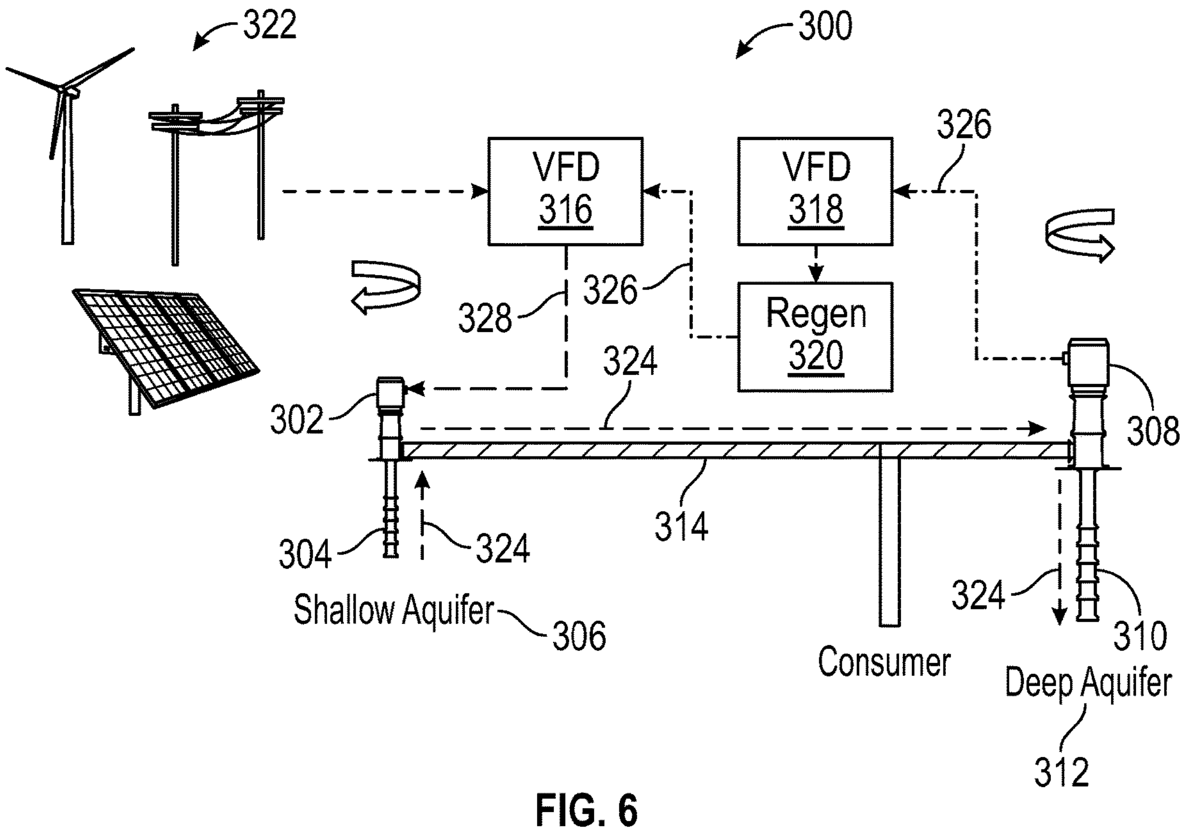
FIGS. 6 and 7 are schematic diagrams of an aquifer storage and recovery system connected to a renewable energy power plant, according to another embodiment.

For example, FIG. 6 illustrates an aquifer pumped-storage hydroelectric system 300 similar to the system 10 including a first electric motor 302 and pump 304 in fluid communication with a reservoir 306 in the form of a relatively shallow alluvial well/aquifer (can also be a manmade or natural above-ground or underground storage). The system 300 further comprises a second electric motor 308 and pump 310 in fluid communication with a relatively deep aquifer 312 via a well bore, as described above. A pipe or conduit 314 can interconnect the wells between aquifers 306 and 312. A VFD 316 can be coupled to the electric motor 302, and a VFD 318 can be coupled to the electric motor 308. A regeneration module 320 can also be connected to the VFD 316 and the VFD 318. The VFDs can be electrically connected to a power source such as a utility (e.g., utility transmission lines), and/or to a power plant, such as a renewable energy power plant 322, which can include any of various renewable power sources including wind turbines, photovoltaic/solar cells, etc.

Figure 7:
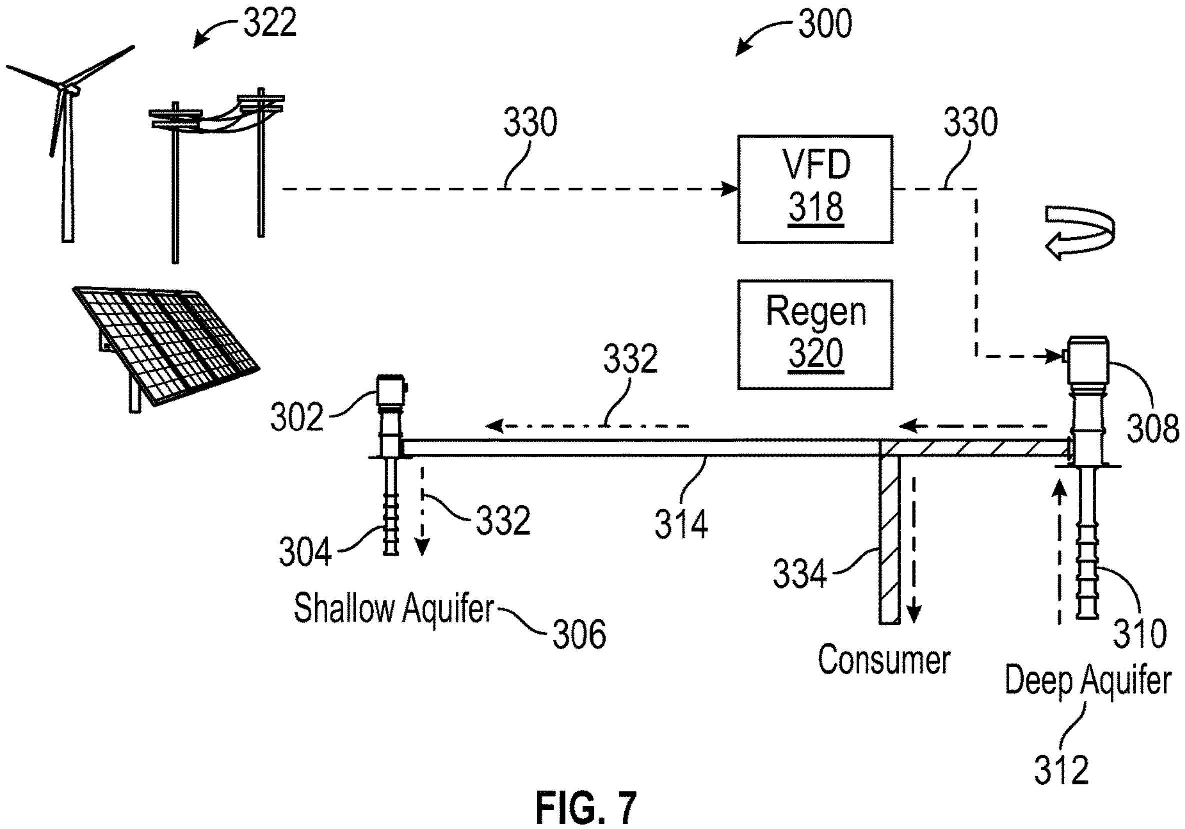

FIG. 6 shows the direction of electric power and water flows during injection of water into the deep aquifer 312. As water is withdrawn from the shallow aquifer 306 and injected into the aquifer 312 as indicated by arrows 324, the electric motor 308 can be operated in the regeneration mode according to any of the methods described herein. Electric power generated by the electric motor 308 can be supplied to the power source 322 (e.g., to a utility) as indicated by arrows 326, and/or used to run the electric motor 302 as indicated by arrow 328. Power generation by the electric motor 308 can be optimized using any of the routines described herein. Referring to FIG. 7, during periods when electrical power production from the renewable power source exceeds power demand, the extra power 330 can be used to pump water from the deep aquifer 312. The water can be returned to the reservoir/shallow aquifer 306 as indicated by arrows 332, and/or supplied to water consumers through a conduit 334.

Figure 8:
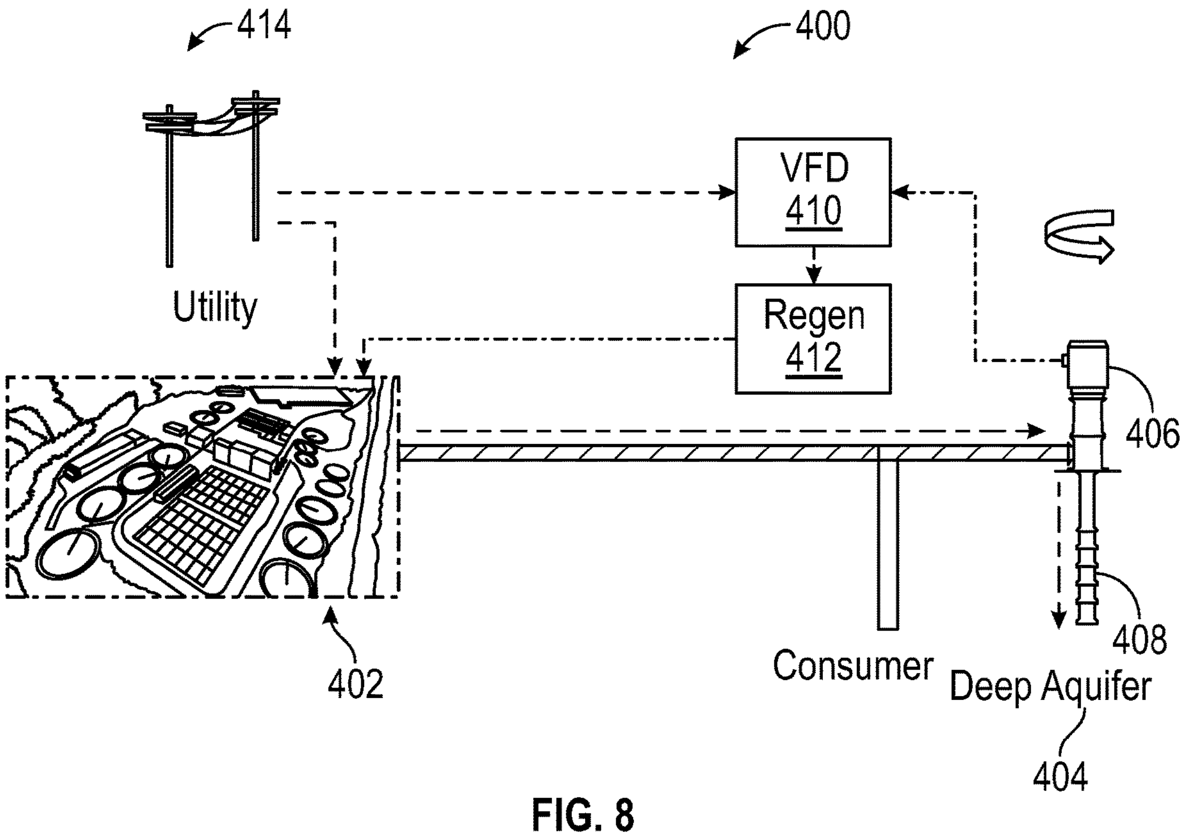
FIGS. 8 and 9 are schematic diagrams of an aquifer storage and recovery system connected to a water source, according to another embodiment.
Figure 9:
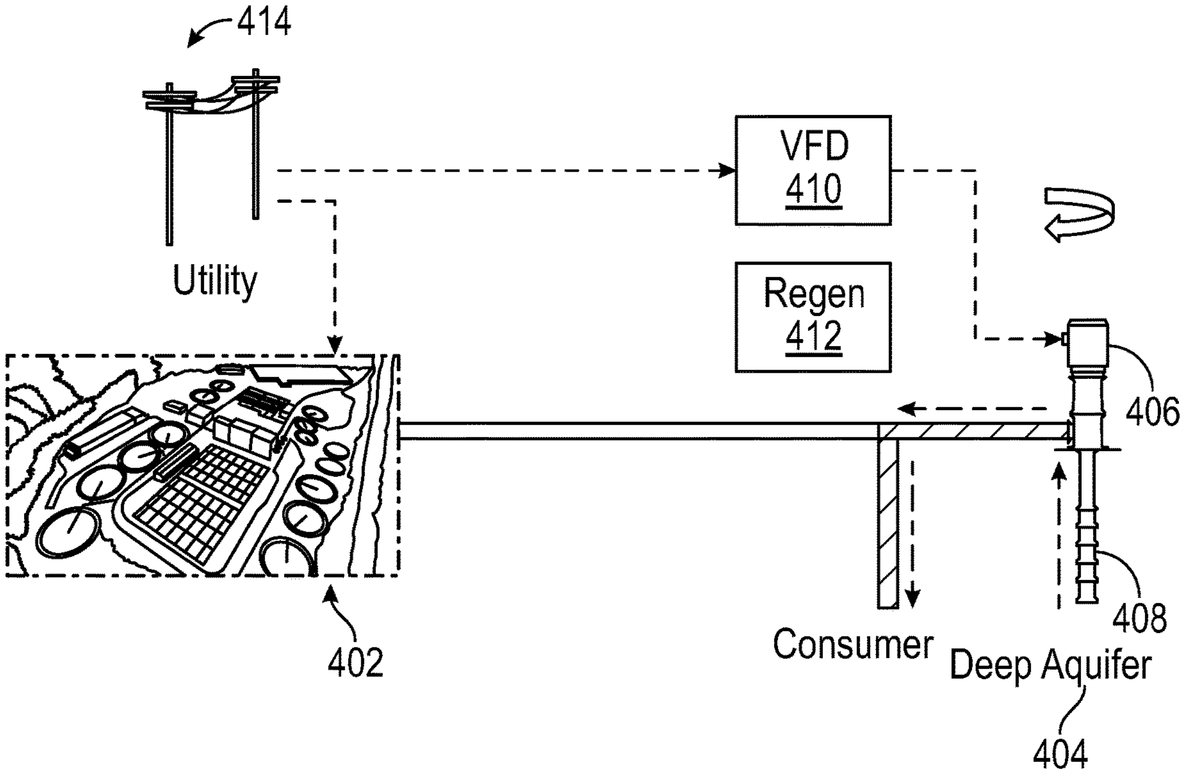

FIGS. 8 and 9 illustrate another embodiment of a system 400 where water from a water source such as a fresh water or wastewater treatment plant 402 is stored in an aquifer 404. An electric motor 406, pump 408, VFD 410, and regeneration module 412 can operate as described herein to produce electricity, which can be consumed by the water treatment plant 402 and/or supplied back to the power grid 414. When treated water is needed, the water can be recovered from the aquifer 404 as indicated in FIG. 9 and supplied to water consumers.

Figure 10:
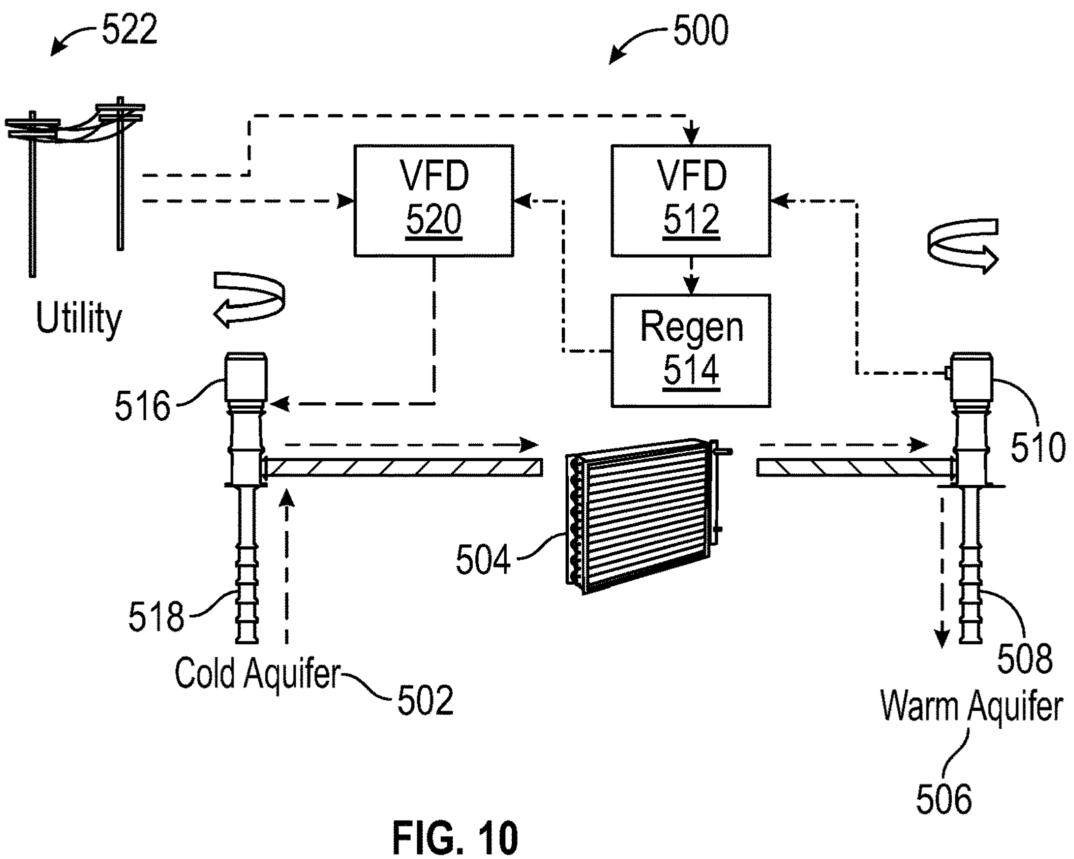
FIGS. 10 and 11 are schematic diagrams of an aquifer storage and recovery system configured for geothermal heating and cooling, according to another embodiment.
Figure 11:
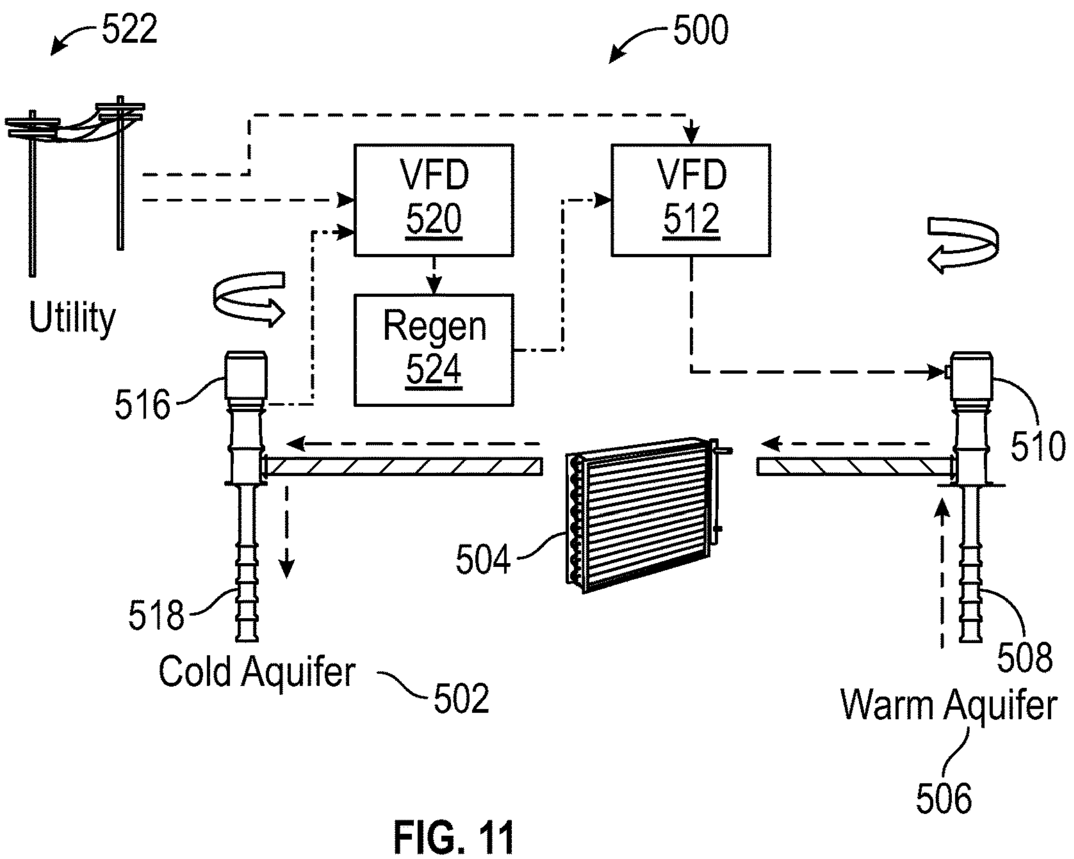

FIGS. 10 and 11 illustrate another embodiment of a system 500 where water is withdrawn from a first, cold aquifer 502, passed through a heat exchanger 504 (e.g., a water to air heat exchanger), and stored in a second, warm aquifer 506. FIG. 10 illustrates operation in a cooling mode in which cold water is withdrawn from the cold aquifer 502, passed through the heat exchanger 504 to provide cooling (e.g., to a building, premises, campus, district, etc.), and injected into the warm aquifer 506. The pump 508, electric motor 510, VFD 512, and regeneration module 514 can operate in the regeneration mode as described herein to generate electricity, which can be used to power the electric motor 516 and the pump 518 of the cold aquifer 502. FIG. 11 illustrates flow in the reverse direction, where warm water is withdrawn from the warm aquifer 506, passed through the heat exchanger 504 to provide heating, and injected back into the cold aquifer 502, during which the electric motor 516, a VFD 520, and a regeneration module 524 can generate electric power. Additional power can be supplied to/from a utility grid 522. In certain embodiments, the warm and cold aquifers can be different regions of the same underground formation spaced apart sufficiently so as to be thermally isolated from each other.

Figure 12:
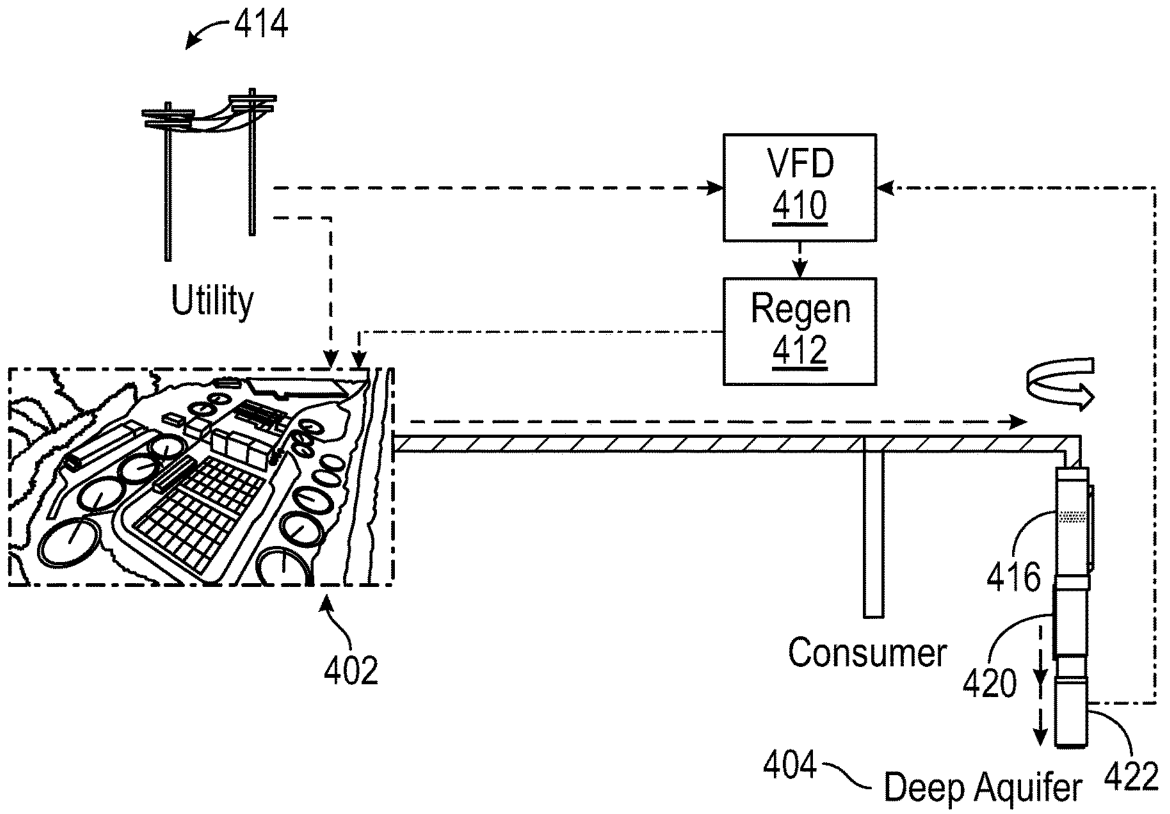
FIGS. 12 and 13 are schematic diagrams of the aquifer storage and recovery system of FIGS. 8 and 9 including a down well flow control valve configured to allow water injection and recovery through the same well bore.
Figure 13:
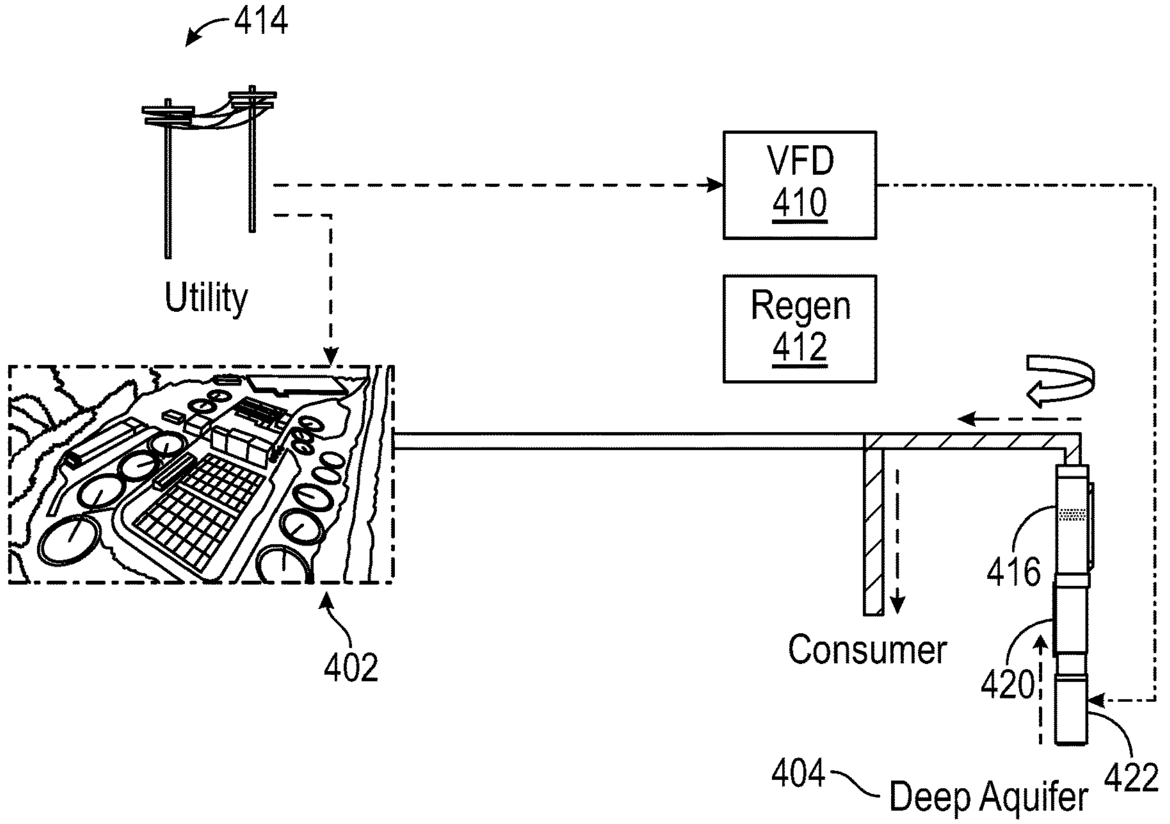

FIGS. 12 and 13 illustrate another embodiment of the system 400 including a down well flow control valve 416 and a submersible pump and motor assembly configured to allow water injection and water recovery from the aquifer 404 through the same well bore. In the configuration illustrated in FIGS. 11 and 12, the down well flow control valve 416 is coupled to a well column pipe 418. The down well flow control valve 416 is in fluid communication with a pump 420 coupled to the lower end of the down well flow control valve 416. A submersible electric motor 422 can be coupled to the lower end of the pump 420. The submersible electric motor 422 can drive the pump 420 to pump water up the well column pipe when operating in the pumping mode, and water pressure can drive the pump in the manner of a turbine to operate the submersible electric motor as a generator in the regeneration mode, as described above.

In certain embodiments, when operating in the regeneration mode, the down well flow control valve 416 can be configured to direct water flow through the pump 420, and/or through the pump 420 and around or outside the pump directly into the aquifer. For example, in certain embodiments the down well flow control valve 416 can comprise a plurality of apertures arranged in discrete groups separated along the length of the valve body, such as shown and described with reference to FIG. 22. When the down well flow control valve is between 1% and 50% open, water can flow through a first group of apertures into the pump 420, and the submersible electric motor 422 can spin to generate electricity. When the down well flow control valve 416 is 51% to 100% open, water can flow through the first group of apertures into the pump, as well as through a second group of apertures arranged such that the water flow through the second group of apertures bypasses the pump. Accordingly, the submersible electric motor 422 can spin to produce electricity, and water can simultaneously be injected directly into the aquifer without flowing through the pump 420. When the down well flow control valve is 100% closed, the electric motor 406 can be driven in the opposite direction to pump water out of the aquifer, as described further below with reference to FIGS. 20-22.

Example 5: Further Regeneration Mode Operation

In another representative embodiment, the controller 32 can operate as follows. The controller 32 can check to see if the down well control valve (e.g., valve 22) is fully closed by pressurizing the closed hydraulic circuit/system 44 (FIG. 2). After the controller determines that the valve 22 is fully closed, it can open the source water supply valve at the well head. This can provide water and pressure into the well column 12 and force out air in the well column pipe. When the controller determines that the flow going into the well has stopped and the pressure in the well column has reached a set point, it proceeds to the next step.

In certain embodiments, the next stage can be for the down well control valve 22 to slowly open to allow for the water to start to flow into the aquifer at the target flow rate. The target flow rate or flow rate set point can be programmed by an operator, or selected by the controller 32 based on one or more criteria, such as maintaining positive pressure at the top of the well head. As water flows through the pump 18 backwards it causes the pump bowls/pumping elements to also turn in the reverse direction. Once the controller 32 determines that the target flow and pressure are being met, it can determine at what speed (e.g., RPM) that the motor rotor is spinning, and can command the VFD 20 to turn in that same reverse direction and at the same speed/frequency. The controller 32 can then transmit commands/control signals to the VFD 20 to run at a lower rotational speed/frequency than a natural/unloaded rotational speed/frequency of the pump 18 at the selected flow rate/pressure, e.g., lower than the rotational speed/frequency at which the water would otherwise drive the pump bowls/pumping elements, causing the excess energy to be placed onto the DC bus 80 (FIG. 3) of the VFD 20. The regeneration module 25 connected to the DC bus can then convert the DC power to AC power and supply that energy back onto the AC grid (or to another load).

The controller 32 can then determine the energy output (e.g., watts) being produced and maximize it by continually adjusting the reverse direction speed of the electric motor 16 to maximize power production. The speed of the motor 16 can be controlled by varying the voltage and/or frequency of the drive signal applied by the VFD 20. If the controller 32 slows the electric motor 16 down too much, the power production will then be less than it was when it was last checked. The controller 32 can then speed the electric motor 16 back up slightly (e.g., by increasing the frequency of the drive signal) to determine if that change produces more or less power, and continue to adjust. If the controller 32 determines that allowing the electric motor 16 to spin faster produces more power, then it can repeat the test by incrementing one or more parameters (e.g., flow rate, pressure, rotational velocity, drive signal voltage, drive signal frequency, etc.) to see if the same result occurs again. The controller 32 can run this energy check and VFD speed readjust process in a continuous loop, or at selected time intervals, to maximize power production and/or to operate at a selected power production level.

In certain embodiments, using the down well control valve 22 to maintain positive well head pressure and a constant flow rate, along with the controller program that is continually sensing and adjusting parameters to produce maximum power, can provide significant advantages, such as increased electricity generation, as compared to existing ASR generation systems.

Example 6: Rate of Return and Theoretical Power in Regeneration Mode Operation In another exemplary embodiment, the control logic can be written in two executable routines that can be utilized on, for example, Allen Bradly-Rockwell Automation PLC controllers utilizing Studio5000 or RSlogix5000 programming software. The programs can be written utilizing advanced UDT's (User Defined Tags) to facilitate implementation into established existing PLC systems. The logic can also be converted to other PLC controllers if desired.

In certain embodiments, the first routine can be a regeneration power calculation program, and the second routine can be a regeneration tune calculation program. The first routine can be configured to calculate (using, for example, a theoretical generated electricity quantity based on the injection flow and well head pressure) a "rate of return" count down for the user that alerts the user to the point at which an initial capital investment (e.g., to purchase and install the system) would be paid off. The second routine can be configured to 'tune' the system by varying any of various operational parameters to maximize/optimize electricity generation for a given set of operating conditions.

Figure 14:
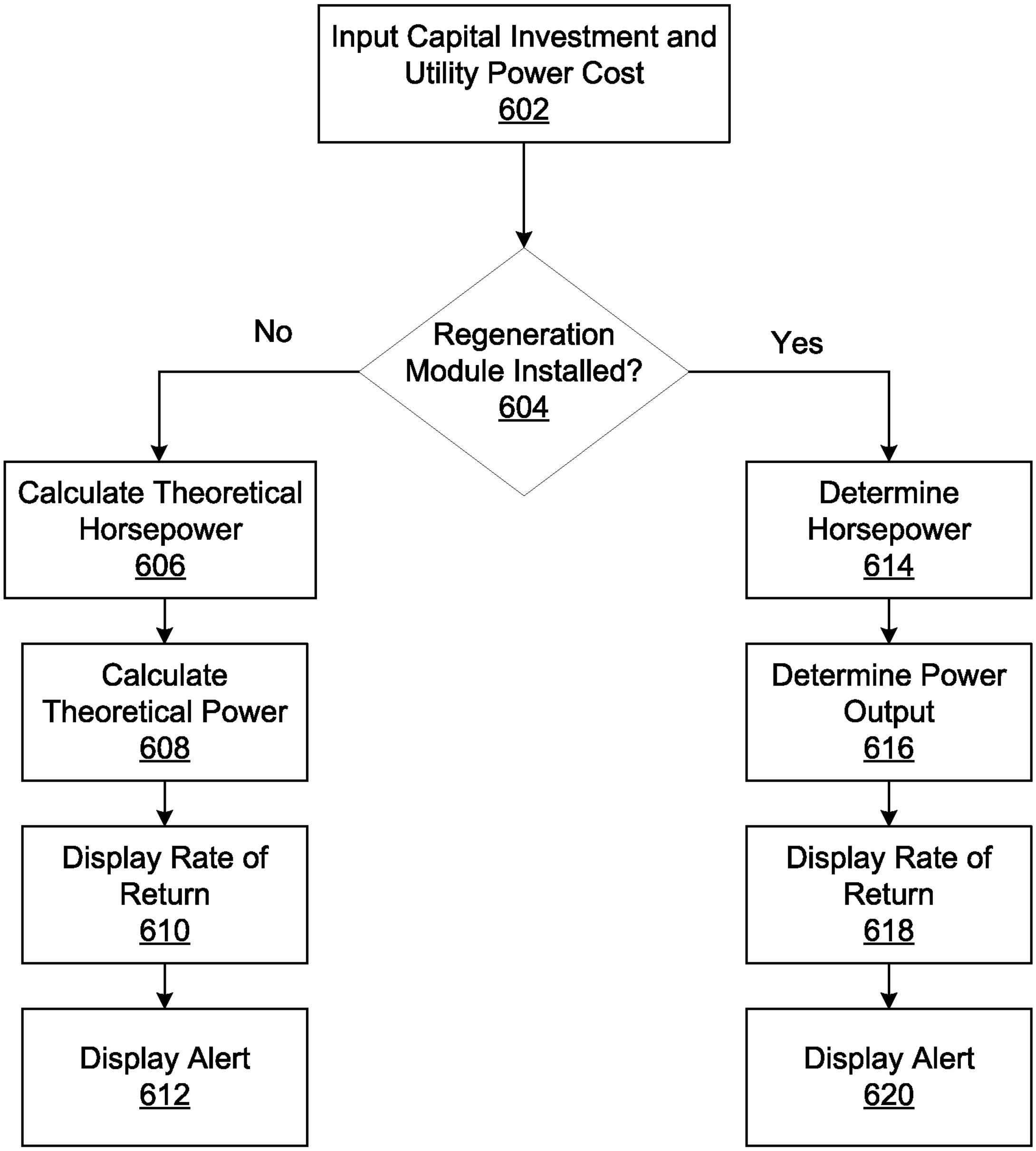
FIG. 14 is a process flow diagram of a regeneration power output calculation method, according to one embodiment.

Referring to FIG. 14, as noted above the first routine can be a regeneration power calculation program. In certain embodiments, using mathematical equations and in combination with injection flow, well head pressure and/or aquifer level a theoretical generated power (e.g., horsepower or kW) can be calculated. At process block 602, a user can input (e.g., using an HMI screen or other interface) the total capital investment cost and the utility power cost. At process block 604, if a regeneration module is not installed, the first routine can, at process block 606, calculate a theoretical horsepower/torque generated (e.g., by the pump) and, at block 608, calculate a theoretical power generated by the regeneration module during the injection process. At process block 610, the routine can display a theoretical "rate of return" countdown based on the theoretical horsepower/torque and the theoretical power generated and, at block 612, can alert the user when the initial capital investment could have been paid off if they had installed ASR power regeneration with the use of control functionality/logic as described herein.

Referring again to block 604, if a regeneration module is installed, the controller can determine the real/actual horsepower and/or torque from the motor starter/VFD at block 614. At block 616, the controller can determine the power output generated by the electric module (e.g., from the regeneration module). Based on the horsepower/torque and the power generated, at block 618 a rate of return countdown can be displayed and, at block 620, the system can alert the user when the initial capital investment has been paid off by the electricity generated using the ASR power regeneration system. In certain embodiments, the actual power generated can be determined from a meter (e.g., meter 70 of FIG. 3) and displayed to the user during regeneration operation.

Figure 15:
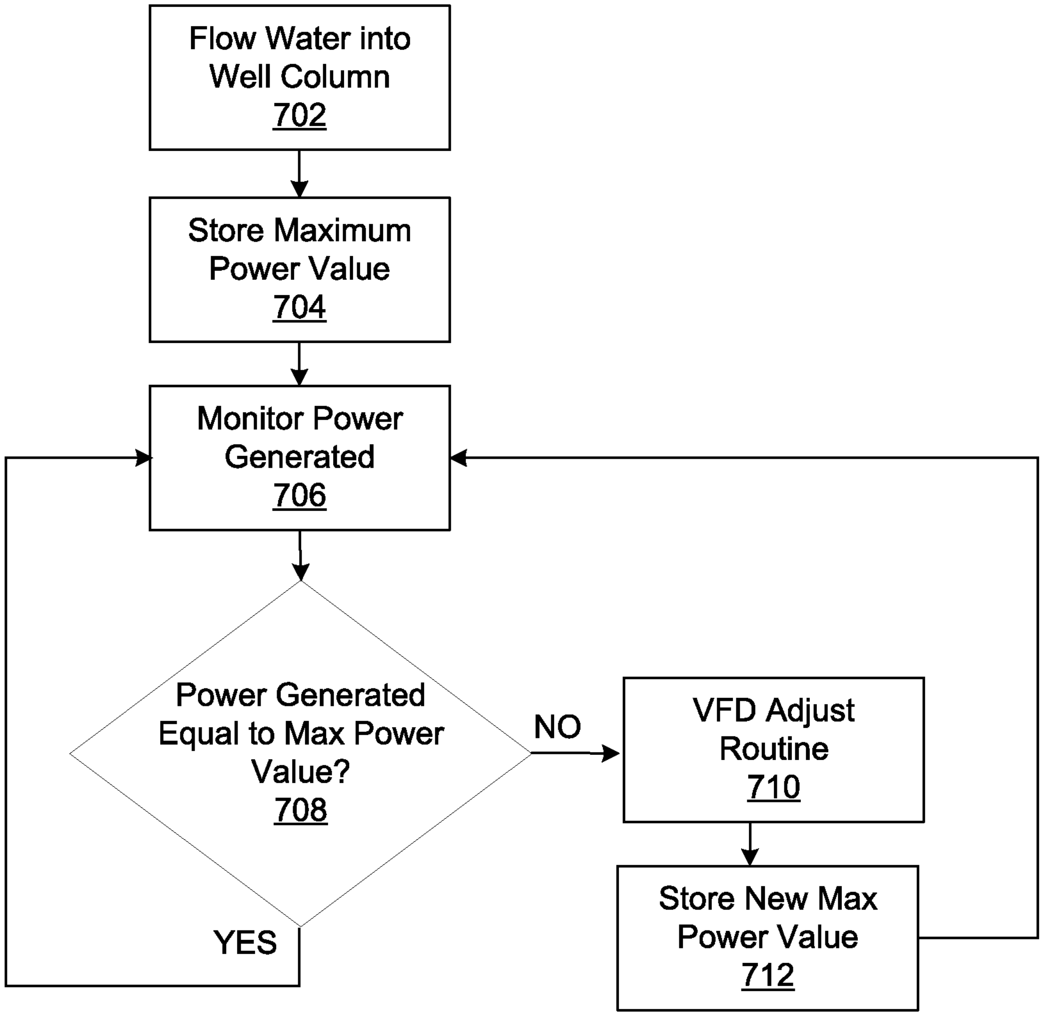
FIG. 15 is a process flow diagram illustrating another method of generating electricity with the system of FIG. 1.

Referring to FIG. 15, the second routine can be a regeneration mode tuning or calculation program. For example, at process block 702 the controller can transmit control signals to flow water into the well column. At process block 704, during the initial startup of the injection process (e.g., while water is flowing into the well column from the reservoir) the controller can store a maximum power value (e.g., kW) generated by the electric motor as determined from the regeneration module. At process block 706, as the injection process proceeds the controller can continuously monitor the power supplied from the regeneration module. At process block 708, if the current power equals the maximum power value, then the controller can continue to monitor the power as at block 706. However, if the current power does not equal the stored maximum power value, then the controller can initiate a VFD adjusting routine or tuning routine at process block 710, in which the frequency of the drive signal is varied according to any of the embodiments described herein. For example, the stored maximum power value can be used as a set point value for a PID tuned control loop. In certain embodiments, the VFD feedback speed in Hz (e.g., the frequency of the drive signal) can be scaled for use in the PID tuned loop. The controller can also calculate a theoretical horsepower/torque as described above. A first value, in one example 99% of the theoretical horsepower, and a second value, in one example 101% of the theoretical horsepower, can be calculated by the controller.

In certain embodiments, if the calculated theoretical horsepower changes (e.g., in relation to a change in flow, level, and/or pressure) or drops below the first value (e.g., 99% of the theoretical horsepower), a zero can be moved into/substituted for the maximum power stored value, and on the next scan/execution of the program loop a new maximum power value can be stored. In certain embodiments, this logic can be fail-safe logic to protect the electric motor and VFD/regeneration module from dramatic changes in flow and/or pressure.

If the calculated theoretical horsepower changes (e.g., in relation to a change in flow, level, or pressure) or rises above the second value (e.g., 101% of the theoretical horsepower), a zero can be moved into/substituted for the maximum power stored value, and on the next scan/execution of the loop a new maximum power value can be stored. This logic can also protect the electric motor and/or VFD/regeneration module from dramatic changes in flow and/or pressure.

In certain embodiments, if the scaled VFD feedback signal is above a selected first constant value in the programming (e.g., 8192 in one particular embodiment), then the controller can slow the VFD drive signal speed/frequency and can stop adjusting the VFD drive signal speed/frequency when the VFD scaled feedback signal is at the first constant value. If the scaled VFD feedback signal is at or below a selected second constant value (e.g., 8191 in one particular embodiment), then the PID tune loop will speed up the VFD speed and will stop adjusting the VFD speed when the VFD scaled feedback signal is at the second constant value. This can correlate with maximum power by the electric motor under the flow conditions. The maximum power generated can be stored as a maximum power value at 712 and the program routine can start over at 706 with the controller monitoring the power generated.

Example 7: Example Computing Environment

Figure 16:
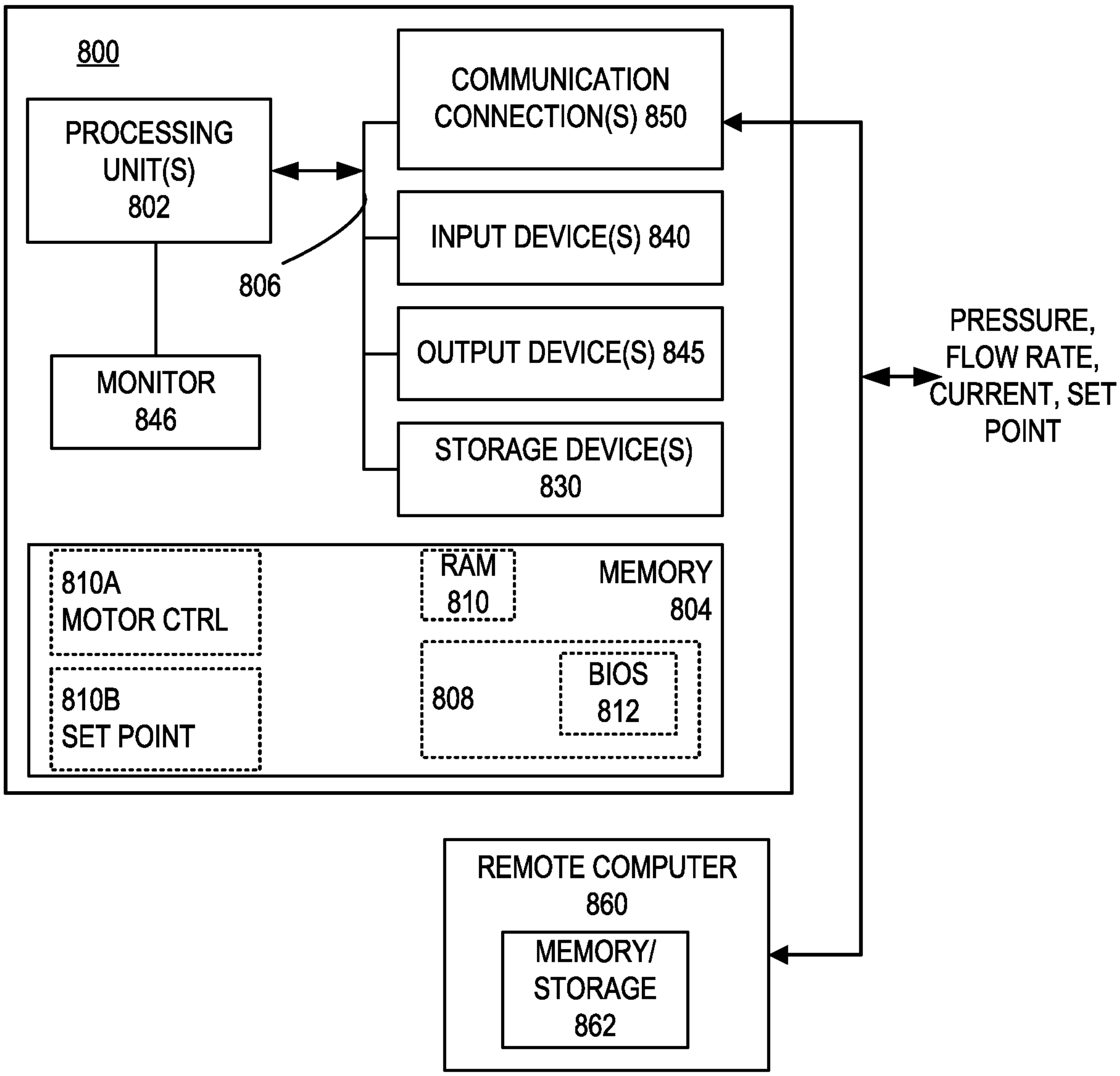
FIG. 16 is a schematic block diagram illustrating a representative computing environment in which any of the disclosed technologies can be implemented.

FIG. 16 and the following discussion are intended to provide a brief, general description of an exemplary computing environment in which the disclosed technology may be implemented. For example, the methods and processes described herein can be carried out by a controller or processor configured similarly to the computing environment described below. Moreover, the disclosed technology may be implemented with other computer system configurations, including hand held devices, digital signal processors (DSPs), multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network.

With reference to FIG. 16, an exemplary system for implementing the disclosed technology includes a general-purpose controller in the form of an exemplary PC 800, including one or more processing units 802, a system memory 804, and a system bus 806 that couples various system components including the system memory 804 to the one or more processing units 802. The system bus 806 may be any of several types of bus structures including a memory bus or memory controller, a peripheral bus, and a local bus using any of a variety of bus architectures. The exemplary system memory 804 includes read only memory (ROM) 808 and random-access memory (RAM) 810. A basic input/output system (BIOS) 812, containing the basic routines that help with the transfer of information between elements within the PC 800, is stored in ROM 808. In the example of FIG. 16, processor-executable instructions for controlling the motor, the VFD, the valves, the regeneration module, and operational modes of the system can be stored in a memory 810A, and data such as set points (e.g., current, voltage, flow rate, pressure, etc.) can be stored in memory 810B.

The exemplary PC 800 further includes one or more storage devices 830 such as a hard disk drive for reading from and writing to a hard disk, a magnetic disk drive for reading from or writing to a removable magnetic disk, and an optical disk drive. Such storage devices can be connected to the system bus 806 by a hard disk drive interface, a magnetic disk drive interface, and an optical drive interface, respectively. The drives and their associated computer readable media provide nonvolatile storage of computer-readable instructions, data structures, program modules, and other data for the PC 800. Other types of computer-readable media which can store data that is accessible by a PC, such as magnetic cassettes, flash memory cards, digital video disks.

A number of program modules may be stored in the storage devices 830 including an operating system, one or more application programs, other program modules, and program data. A user may enter commands and information into the PC 800 through one or more input devices 840 such as a keyboard and a pointing device such as a mouse. A monitor 846 or other type of display device is also connected to the system bus 806 via an interface, such as a video adapter. Outputs such as commands, drive signals, etc., can be transmitted via one or more output devices 845.

The PC 800 may operate in a networked environment using logical connections to one or more remote computers, such as a remote computer 860 including a memory 862. In some examples, one or more network or communication connections 850 are included. The remote computer 860 may be another PC, a server, a router, a network PC, or a peer device or other common network node, and typically includes many or all of the elements described above relative to the PC 800, although only a memory storage device 862 has been illustrated in FIG. 16. The personal computer 800 and/or the remote computer 860 can be connected to a logical a local area network (LAN) and a wide area network (WAN). In certain embodiments, the remote computer 860 can comprise a virtual processor implemented in a remote server environment or cloud computing environment. In certain embodiments, the systems and/or controllers described herein can be managed controlled/remotely through a remote or cloud computing platform, and/or can provide data to or retrieve operational settings from the remote computing platform.

Example 8: Exemplary Down Well Flow Control Valves

FIGS. 17-19 illustrates representative examples of down well flow control valves that can be used in combination with any of the ASR systems described herein. FIG. 17 illustrates an exemplary well column 900 including upper casing section 922, intermediate casing section 924, and lower casing section 926, and comprising a down well flow control valve 902 (shown in an open position) that selectively allows liquid to flow from an upper aquifer or reservoir 904 to a subterranean aquifer 906 via a liquid flow passageway 905 having opening 907, as indicated by arrows 908. Liquid indicated by arrows 908 that is being pumped into well column 900 flows downwardly into the valve assembly 902, outwardly through apertures 910, upwardly between the well casing 912 and bore hole 914 to and into the upper reservoir 904. When the down well flow control valve 902 is in a closed position (e.g., with valve member 916 covering apertures 910) the lower apertures 918 provide a bypass passageway permitting the flow of liquid through the valve assembly 902 from the exterior of conduit 920, through apertures 918 to the interior of conduit 920 and to or from the intermediate and lower casing sections 924, 926 of the well column 900 where the liquid can be delivered to the lower aquifer 906. The valve 902 can be moved into a 'shut-off' position, wherein valve member 916 overlies and closes the apertures 910 and wherein a second valve member or plug 928 closes the apertures 918 and the interior passageway through the conduit section 920. As a result, liquid cannot flow to or from apertures 910 or through the conduit to or from the lower section of the well casing.

The down well flow control valve in FIG. 17 can be used for operation in the regeneration mode when supplying water to the upper aquifer 904 (as shown in FIG. 17), for example, when the pump is located above the down well flow control valve. The down well flow control valve of FIG. 17 can also be installed above a pump and submersible electric motor combination (e.g., as shown in FIGS. 12, 13, and 20-22), enabling regeneration mode operation during water injection into the lower aquifer 906. In certain embodiments, a pump (e.g., a line shaft pump) can be disposed above the down well flow control valve 902 and a submersible pump/motor assembly can be disposed below the down well flow control valve 902 to enable operation in the regeneration mode when recharging both the upper aquifer 904 and the lower aquifer 906.

FIGS. 18-19 illustrate another exemplary well column 1000 including a pipe section 1002. For example, the pipe section 1002 can be a six-inch inside diameter steel pipe having threads 1004, 1006 at its opposite ends for coupling to associated pipe components. The pipe 1002 can include at least one aquifer recharge outlet (e.g., comprising a plurality of apertures) through which liquid can pass to recharge an aquifer. FIG. 18 illustrates an exemplary plurality of apertures 1008 disposed in a spiral pattern along a section 1010 of the pipe 1002. FIG. 19 illustrates a vertical sectional view through a portion of pipe section 1002. The pipe section 1002 comprises a valve 1012 movable between a first position wherein the valve 1012 does not overlie and seal the apertures 1008 and a second position in which the valve 1012 overlies and closes the apertures. When open, as shown in FIG. 19, a flow path (shown by arrows 1014) exists through the center of the pipe section 1002 and outwardly through the apertures 1008. The valve 1012 can be positioned within a support structure, such a cage structure 1016. The cage structure can comprise upper and lower cross-pieces 1018, 1020 with the valve 1012 retained between them, and a plurality of braces 1022 extending between the upper and lower cross-pieces. A drive mechanism can be provided for shifting the cage 1016 and therefore the valve 1012 between the open and closed position. It should be noted that a plurality of open positions are provided depending on the number of apertures 1008 that are exposed. The drive mechanism can include at least one, and in the illustrated embodiment, two, valve closing cylinders 1024 and at least two valve operating cylinders 1026. Extension and/or retraction of the cylinders 1024, 1026 can open and close the valve 1012. Further details of exemplary down well flow control valves can be found, for example, in U.S. Pat. Nos. 8,522,887 and 7,156,578, which are incorporated herein by reference. In certain embodiments, the down well flow control valve can also comprise springs or other biasing mechanisms to bias the valve, shroud, etc., to the closed position. Further details regarding such valve configurations can be found in U.S. Publication No. 2006/0127184, which is incorporated herein by reference.

Example 9: Down Well Flow Control Valve Assembly with Sleeve

Figure 20:
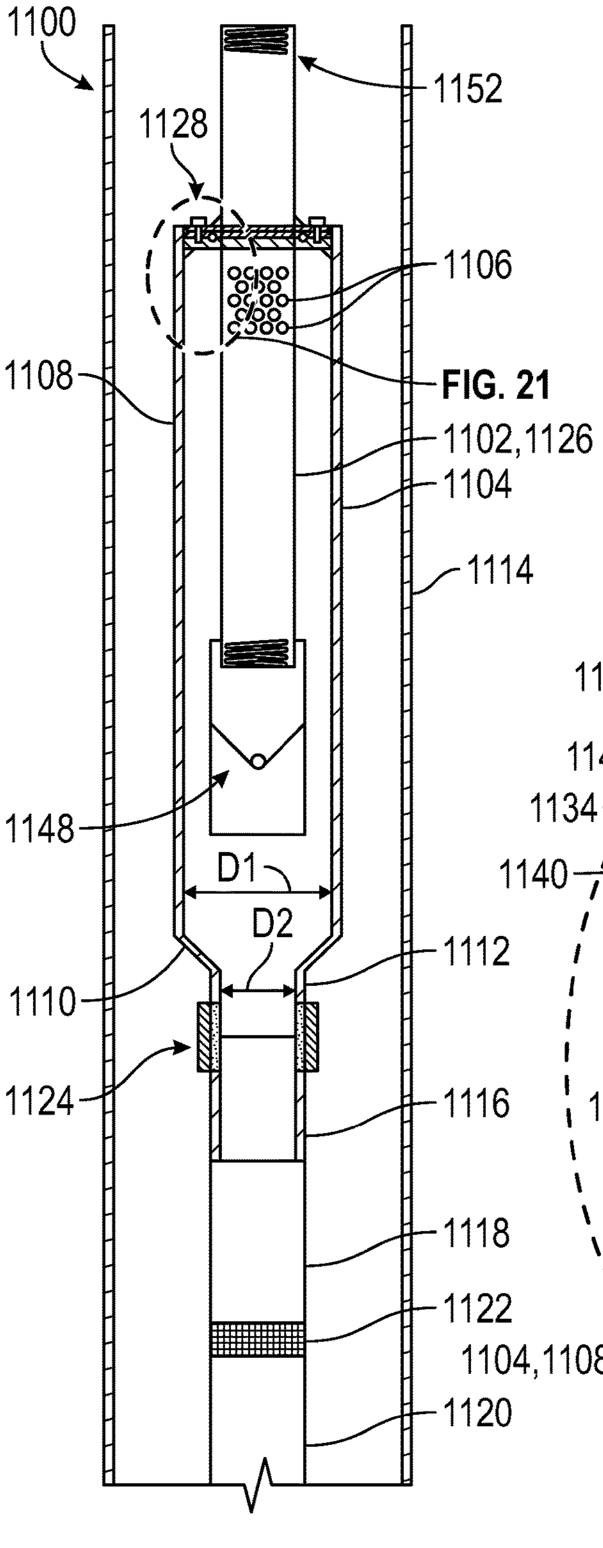
FIG. 20 is a cross-sectional view of a portion of a well bore illustrating an assembly including a down well flow control valve coupled to and received in a sleeve.
Figure 21:
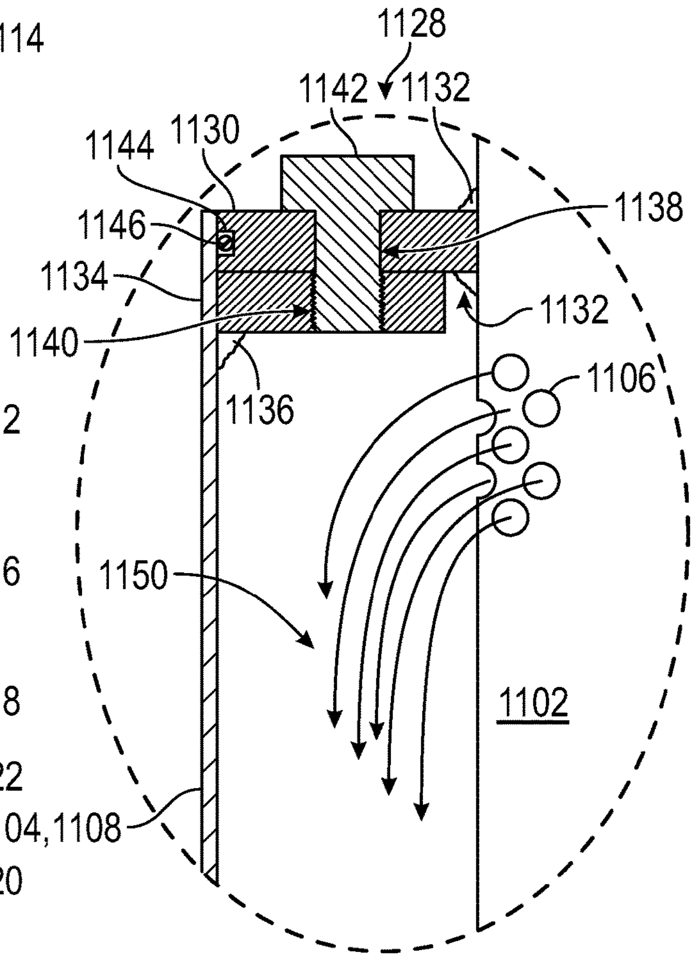
FIG. 21 is a magnified cross-sectional view of a portion of the coupling between the down well flow control valve and the sleeve in FIG. 20.

FIGS. 20 and 21 illustrate an embodiment of an assembly 1100 comprising a down well flow control valve 1102 received at least partially within and coupled to a sleeve or conduit 1104. The assembly is shown disposed in a well bore 1114. The down well flow control valve 1102 can be coupled to the well column pipe above it by a threaded portion 1152 at the upper end of the valve. The down well flow control valve 1102 can comprise a plurality of openings or apertures 1106 through which water can flow, and can be configured according to any of the flow control valve embodiments described herein.

The sleeve 1104 can comprise a first, upper, or inlet portion 1108, a second, tapered intermediate portion 1110, and a third, lower, or outlet portion 1112. The first portion 1108 can have a first diameter D1 that is greater than a second diameter D2 of the outlet portion 1112. The diameter of the intermediate portion 1110 can taper between the first diameter D1 and the second diameter D2. The outlet portion 1112 can be coupled to a conduit or well column pipe 1116 at a coupling 1124, and the conduit 1116 can extend deeper into the well bore 1114. The conduit 1116 can have the second diameter D2. In certain embodiments, the conduit 1116 can be coupled to a pump 1118, and optionally to a combination pump and submersible electric motor 1120 as illustrated in FIG. 20. In the illustrated embodiment, a screen or mesh 1122 can be disposed between the pump 1118 and the electric motor 1120. The conduit 1116 can have any length. In certain embodiments, the pump 1118 can be coupled directly to the outlet portion 1112 of the sleeve 1104. The sleeve 1104 can thus be in fluid communication with the pump 1118.

In the illustrated embodiment, the sleeve 1104 can be coupled to the exterior body/casing/shell 1126 of the down well flow control valve 1102 by a coupling 1128. FIG. 21 illustrates the coupling 1128 in greater detail. In the illustrated embodiment, the coupling 1128 can be an assembly comprising a flange member 1130 coupled to the down well flow control valve 1102 and a flange member 1134 coupled to the interior surface of the sleeve 1104. The flange member 1130 can be welded to the casing 1126 of the down well flow control valve 1102, as shown at 1132, or can be integrally formed with the casing. As used herein, the terms "integrally formed" and "unitary construction" refer to a construction that does not include any welds, fasteners, or other securing means for securing two features together. The flange member 1134 can be positioned within the bore of the inlet portion 1108 of the sleeve 1104. In the illustrated embodiment, the flange member 1134 is welded to the inside wall of the inlet portion 1108 at a weld 1136, although it will be understood that the flange member 1134 can also be integrally formed with the sleeve 1104 such that the sleeve and flange are a unitary construction.

Each of the flanges 1130 and 1134 can define a plurality of openings configured to be aligned with one another when the sleeve 1104 is coupled to the down well flow control valve 1102, and through which fastener members can be inserted to secure the flange members together. For example, with reference to FIG. 21, the flange member 1130 can define an opening 1138 and the flange member 1134 can define a corresponding opening 1140 through which a fastener member configured as a bolt 1142 is inserted. In the illustrated embodiment, the opening 1140 can be threaded, although in other embodiments both openings can be threaded, and/or the bolt can be secured in place with a nut.

In certain embodiments, the coupling 1128 can further comprise one or more sealing members. For example, in certain embodiments one or both of the flange members 1130, 1134 can be configured to accommodate a sealing member. In the illustrated embodiment, the flange member 1130 defines a groove or channel 1144 extending circumferentially around the radially outward surface of the flange, and in which a sealing member configured as an O-ring 1146 is received. In certain embodiments, a sealing member such as an O-ring and/or a gasket can also be disposed between the flange members 1130 and 1134 such that tightening the bolts 1142 compresses the sealing member and seals the space between the flange members. In certain embodiments, the flange member 1134 can be positioned above the flange member 1130. In such a configuration, the flange member 1130 can have a smaller diameter to allow the weld 1136 to extend beyond the flange 1130.

In the illustrated embodiment, a one-way valve such as a check valve 1148 can be coupled to the lower or distal end of the down well flow control valve casing 1126. The check valve 1148 can be configured to permit flow upwardly in FIG. 20 into the down well flow control valve 1102, and to restrict flow downwardly through the check valve into the well column.

During operation in the pumping mode, the pump 1118 can pump water upwardly in FIG. 20, causing the check valve 1148 to open. The apertures 1106 of the down well flow control valve 1102 can be closed such that water can flow through the down well flow control valve 1102 and upwardly through the well column pipe to, for example, the source reservoir. The sealed coupling 1128 can prevent water flow out of the top of the sleeve 1104. During operation in the regeneration mode, the apertures 1106 of the down well flow control valve 1102 can be opened, and water can flow through the down well flow control valve and into the inlet portion 1108 of the sleeve 1104, as indicated at 1150 in FIG. 21. The water can then flow through the outlet portion 1112 of the sleeve 1104 (thereby bypassing the check valve 1148), through the conduit 1116, and into the pump 1118, where it can spin the pump and the electric motor in the reverse direction to generate electricity as described above. The assembly 1100 thereby allows bi-directional water flow through the down well flow control valve 1102 without requiring any significant modifications to the down well flow control valve. Accordingly, existing well systems with down well flow control valves as described herein can be modified with the sleeve 1104 and other components of the assembly 1100 to permit operation in the pumping mode and the regeneration mode as described herein.

Figure 22:
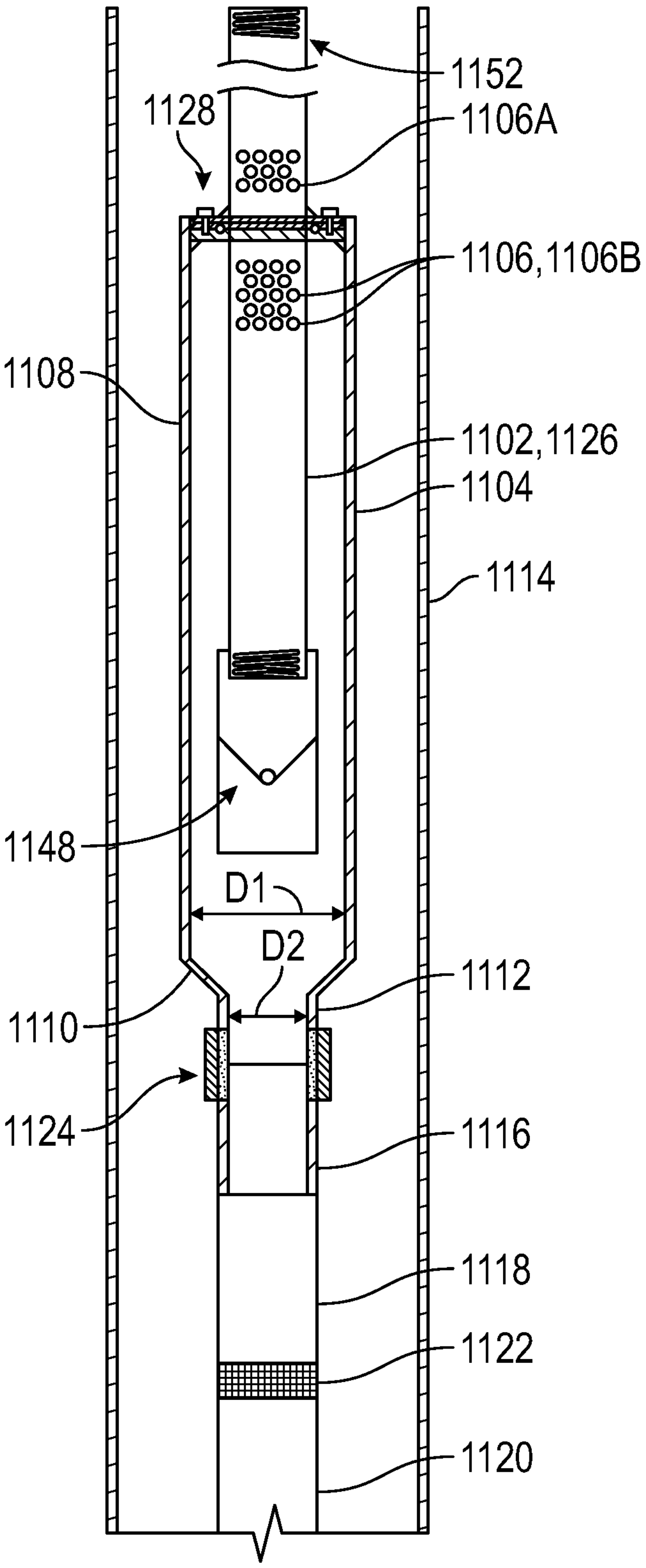
FIG. 22 illustrates another embodiment of the assembly of FIG. 21 in which the down well flow control valve includes apertures disposed within the sleeve and outside of the sleeve.

In yet another embodiment, the position of the coupling 1128 can be varied according to the particular requirements of the system to allow a portion of water flow through the down well flow control valve 1102 to flow through the sleeve 1104 to the pump 1118, while at the same time allowing a portion of the water to flow out of the down well flow control valve, bypass the sleeve 1104, and flow directly into the aquifer without passing through the pump. Such a configuration is shown in FIG. 22, in which the down well flow control valve 1102 comprises two groups of apertures 1106, one group of apertures 1106A being above the coupling 1128 and one group of apertures 1106B being disposed within the sleeve 1104. Accordingly, when water flows into the aquifer, a portion of the water flow will be directed through the apertures 1106B into the sleeve and thence to the pump 1118 to generate electricity, and a portion of the water flow will flow out of the openings 1106A and directly into the aquifer, bypassing the pump. Such a configuration can be advantageous in scenarios where it is desirable to recharge or refill the aquifer faster than can be achieved by directing 100% of the water through the pump 1108 in the regeneration mode. In certain embodiments, the proportion of apertures 1106A and/or 1106B that are uncovered to permit flow can be controlled/varied between 0% to 100%. In certain embodiments, a valve cover or member similar to the valve member 916 in FIG. 17 can move upwardly in FIG. 22 to uncover the groups of apertures 506B and 506A, with the apertures 506B inside the sleeve 1104 being uncovered first when the valve is opened.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In the present description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

Although there are alternatives for various components, parameters, operating conditions, etc., set forth herein, that does not mean that those alternatives are necessarily equivalent and/or perform equally well. Nor does it mean that the alternatives are listed in a preferred order unless stated otherwise.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims and equivalents of the features recited therein. We therefore claim all that comes within the scope and spirit of these claims.

The invention claimed is:

1. A down well flow control valve assembly, comprising:
- a down well flow control valve couplable to a well column pipe, the down well flow control valve comprising a plurality of outflow apertures;
- the down well flow control valve being positioned at least partially within a sleeve and coupled to the sleeve; and
- a one-way valve coupled to the down well flow control valve within the sleeve;
- wherein the sleeve and the one-way valve are arranged such that downward water flow through the well column pipe flows out of the down well flow control valve through the outflow apertures, through the sleeve, and bypasses the one-way valve, and upward water flow flows into the sleeve, through the one-way valve into the down well flow control valve, and into the well column pipe.

2. The down well flow control valve assembly of claim 1, further comprising a pump in fluid communication with the sleeve.

3. The down well flow control valve assembly of claim 1, wherein the down well flow control valve and the sleeve are coupled together by a coupling.

4. The down well flow control valve assembly of claim 3, wherein the coupling comprises:
- a first flange affixed to the down well flow control valve; and
- a second flange affixed to the sleeve;
- wherein the first flange is secured to the second flange.

5. The down well flow control valve assembly of claim 4, wherein the first flange is positioned on top of the second flange such that the second flange supports the down well flow control valve within the sleeve.

6. The down well flow control valve assembly of claim 3, wherein the plurality of outflow apertures is located below the coupling.

7. The down well flow control valve assembly of claim 6, wherein the plurality of outflow apertures is a first plurality of outflow apertures, and the down well flow control valve further comprises a second plurality of outflow apertures above the coupling outside the sleeve.

8. The down well flow control valve assembly of claim 4, further comprising a sealing member disposed around a radially outward surface of the first flange.

9. The down well flow control valve assembly of claim 1, wherein the outflow apertures of the down well flow control valve are openable and closeable.

10. The down well flow control valve assembly of claim 9, further comprising a drive mechanism operable to open and close the outflow apertures of the down well flow control valve.

11. An aquifer storage and recovery system comprising the down well flow control valve assembly of claim 1.

12. A down well flow control valve assembly, comprising:
- a down well flow control valve couplable to a well column pipe, the down well flow control valve comprising an upper end, a lower end, and a casing, wherein the casing defines a plurality of openings;
- a sleeve comprising an inlet portion and an outlet portion, the upper end of the down well flow control valve being coupled to the inlet portion of the sleeve; and
- a one-way valve, the one-way valve being coupled to the lower end of the down well flow control valve and disposed within the sleeve;
- wherein the sleeve and the down well flow control valve are arranged such that downward water flow through the well column pipe flows through the down well flow control valve, through the plurality of openings in the casing, through the sleeve, and bypasses the one-way valve, and upward water flow flows into the sleeve, through the one-way valve into the well flow control valve, and into the well column pipe.

13. The down well flow control valve assembly of claim 12, further comprising a pump disposed below the down well flow control valve and in fluid communication with the sleeve.

14. The down well flow control valve assembly of claim 12, further comprising:

a first flange affixed to the upper end of the down well flow control valve; and a second flange affixed to the inlet portion of the sleeve; wherein the first flange is coupled to the second flange.

15. The down well flow control valve assembly of claim 14, further comprising a sealing member disposed around the first flange.

16. The down well flow control valve assembly of claim 12, wherein all of the plurality of openings defined by the valve casing are positioned within the sleeve.

17. The down well flow control valve assembly of claim 12, wherein at least some of the plurality of openings defined by the valve casing are positioned within the sleeve and at least some of the plurality of openings in the valve casing are positioned outside of the sleeve.

18. An aquifer storage and recovery system, comprising:

a well column pipe disposed in a well bore in fluid communication with a subterranean aquifer formation;

the down well flow control valve of claim 1 coupled to the well column pipe; and a controller;

wherein the sleeve and the down well flow control valve are arranged such that downward water flow through the well column pipe flows out of the down well flow control valve through the outflow apertures, through the sleeve into the aquifer and bypasses the one-way valve, and upward water flow out of the aquifer flows into the sleeve, through the one-way valve into the down well flow control valve, and into the well column pipe;

wherein the controller is configured to control a flow rate into the aquifer through the well by moving the down well flow control valve between an open position and a closed position.

19. The aquifer storage and recovery system of claim 18, further comprising a pump and an electric motor coupled to the pump, wherein the controller is configured to operate the electric motor as a generator when water flows through the well column pipe into the aquifer formation.

20. The aquifer storage and recovery system of claim 19, wherein the controller is configured to open the plurality of outflow apertures during power generation and close the plurality of outflow apertures during water withdrawal.

* * * * *